US009863027B2

(12) United States Patent
Nakano et al.

(10) Patent No.: US 9,863,027 B2
(45) Date of Patent: Jan. 9, 2018

(54) BLACK-PLATED STEEL SHEET

(75) Inventors: Tadashi Nakano, Tokyo (JP); Masaya Yamamoto, Tokyo (JP); Hirofumi Taketsu, Tokyo (JP)

(73) Assignee: NISSHIN STEEL CO., LTD., Tokyo (JP)

( * ) Notice: Subject to any disclaimer, the term of this patent is extended or adjusted under 35 U.S.C. 154(b) by 0 days.

(21) Appl. No.: 14/395,521

(22) PCT Filed: Jun. 29, 2012

(86) PCT No.: PCT/JP2012/004254
§ 371 (c)(1),
(2), (4) Date: Oct. 20, 2014

(87) PCT Pub. No.: WO2013/160973
PCT Pub. Date: Oct. 31, 2013

(65) Prior Publication Data
US 2015/0072166 A1    Mar. 12, 2015

(30) Foreign Application Priority Data

Apr. 25, 2012 (JP) ................................ 2012-100437
Jun. 14, 2012 (JP) ................................ 2012-134807

(51) Int. Cl.
B32B 15/08 (2006.01)
C23C 2/06 (2006.01)
(Continued)

(52) U.S. Cl.
CPC .............. C23C 2/06 (2013.01); B32B 15/095 (2013.01); C22C 18/04 (2013.01); C23C 8/00 (2013.01);
(Continued)

(58) Field of Classification Search
None
See application file for complete search history.

(56) References Cited

U.S. PATENT DOCUMENTS 4,959,277 A * 9/1990 Saeki et al. ................... 428/623
6,465,114 B1 * 10/2002 Honda et al. ................. 428/659
(Continued)

FOREIGN PATENT DOCUMENTS

CN 1503853 A 6/2004
DE 2727111 * 12/1978
(Continued)

OTHER PUBLICATIONS

International Search Report from International Application No. PCT/JP12/004254 dated Sep. 4, 2012.
(Continued)

Primary Examiner — Daniel J Schleis
(74) Attorney, Agent, or Firm — Brundidge & Stanger, P.C.

(57) ABSTRACT

A black-plated steel sheet has a Zn-plating layer containing molten Al and Mg, containing Al in the amount of 1.0-22.0 mass %, containing Mg in the amount of 1.3-10.0 mass %, and having a Zn black oxide distributed in a lamella pattern in the plating layer. The Zn black oxide is a Zn oxide derived from a $Zn_2Mg$ phase. The brightness of the surface of the Zn-plating layer containing the molten Al and Mg has an L* value of 60 or less.

11 Claims, 6 Drawing Sheets

(51) Int. Cl.
*B32B 15/095* (2006.01)
*C23C 8/00* (2006.01)
*C23C 8/16* (2006.01)
*C22C 18/04* (2006.01)
*C23C 28/00* (2006.01)
*C23C 22/73* (2006.01)
*C23C 22/83* (2006.01)

(52) U.S. Cl.
CPC ............... *C23C 8/16* (2013.01); *C23C 22/73* (2013.01); *C23C 22/83* (2013.01); *C23C 28/00* (2013.01); *B32B 2250/03* (2013.01); *Y10T 428/1259* (2015.01); *Y10T 428/12535* (2015.01); *Y10T 428/12549* (2015.01); *Y10T 428/12569* (2015.01); *Y10T 428/12583* (2015.01); *Y10T 428/12611* (2015.01); *Y10T 428/12667* (2015.01)

(56) References Cited

U.S. PATENT DOCUMENTS

| | | | |
|---|---|---|---|
| 2003/0072963 A1* | 4/2003 | Komatsu | C23C 2/06 428/659 |
| 2009/0032145 A1* | 2/2009 | Diaddario et al. | 148/264 |
| 2010/0233469 A1* | 9/2010 | Sasaki | C08G 18/0823 428/327 |

FOREIGN PATENT DOCUMENTS

| | | | |
|---|---|---|---|
| DE | 2727111 A1 | | 12/1978 |
| EP | 1524326 A1 | | 4/2005 |
| JP | 64-56881 A | | 3/1989 |
| JP | 2001-279414 A | | 10/2001 |
| JP | 2002-97559 A | | 4/2002 |
| JP | 2004-256838 A | | 9/2004 |
| JP | 2006124824 | * | 5/2006 |
| JP | 2008-261024 A | | 10/2008 |
| JP | 2012-77322 A | | 4/2012 |
| JP | 2012-082511 A | | 4/2012 |
| WO | 2011/009999 A1 | | 1/2011 |

OTHER PUBLICATIONS

International Publication No. PCT/JP12/004254 published on Oct. 31, 2013.
Chinese Office Action dated Apr. 10, 2015.
Extended European Search Report issued in EP 12875194.8, dated Dec. 10, 2015.

* cited by examiner

BLACK-PLATED STEEL SHEET

TECHNICAL FIELD

The present invention relates to a black-plated steel sheet.

BACKGROUND ART

In the field such as roofing materials and exterior materials of a building, home appliances and automobiles, the needs for steel sheets having a black appearance is increasing from the viewpoints of design and so on. The surface of a steel sheet may be blackened by applying a black coating material to the surface of a steel sheet so as to form a black coating film. In the field described above, however, steel sheets with plating such as hot-dip Zn-plating, hot-dip Al-containing Zn-plating, and hot-dip Al and Mg-containing Zn-plating are used in many cases from the viewpoint of corrosion resistance. The plated steel sheet has a metallic gloss surface with silver gray color. Accordingly, in order to obtain a black appearance of quality design by application of a black coating material, a thick coating film is required to conceal the color of the plated steel sheet, resulting in high coating costs. Furthermore, the thick coating film precludes resistance welding such as spot welding, which is another disadvantage.

As a method for concealing the metallic gloss with silver gray color of a plated steel sheet without formation of a black coating film, a method for blackening a plating layer itself has been proposed (e.g. refer to PTL 1). PTL 1 discloses a method for forming a thin black layer at the plating layer surface by blowing high-temperature water vapor onto a hot-dip Al-containing Zn-plated steel sheet for 24 hours or more. The black-plated steel sheet according to PTL 1 has a plating layer which contains elements for accelerating blackening such as Mg, Cu and Bi. According to the description, however, with a content of elements for accelerating blackening more than 1%, the effect for accelerating blackening rather decreases due to suppression of the oxidation of Zn.

CITATION LIST

Patent Literature

PTL 1
Japanese Patent Application Laid-Open No. SHO 64-56881

SUMMARY OF INVENTION

Technical Problem

The black-plated steel sheet according to PTL 1 has a problem that a thick black layer cannot be formed due to reduction in adhesion, since blackening over the total thickness of a plating layer causes embrittlement of the plating layer. Accordingly, the black-plated steel sheet has no endurance for powerful processing, since scratches to be formed on the plating layer surface by processing spoils the surface appearance due to the exposure of the sliver gray color of the plating layer itself. Further, the black-plated steel sheet according to PTL 1 requires a long time for blackening treatment, which is another problem.

An object of the present invention is to provide a black-plated steel sheet which has excellent retention of the black appearance after processing and can be produced by blackening treatment in a short time.

Solution to Problem

The present inventors have found that the problem can be solved by contacting an original plate of hot-dip Al and Mg-containing Zn-plated steel including 1.0 to 22.0 mass % of Al and 1.3 to 10.0 mass % of Mg, including $Zn_2Mg$ phases distributed in a plating layer, with water vapor in a closed vessel, and have made further investigations to complete the present invention.

More specifically, the present invention relates to the following black-plated steel sheet:

[1] A black-plated steel sheet including a hot-dip Al and Mg-containing Zn-plated layer which contains 1.0 to 22.0 mass % of Al and 1.3 to 10.0 mass % of Mg, with a black oxide of Zn distributed in the plating layer, the hot-dip Al and Mg-containing Zn-plated layer having a surface lightness represented by L* value of 60 or less.

[2] The black-plated steel sheet according to [1], wherein the black oxide of Zn is distributed in a lamellar form in the hot-dip Al and Mg-containing Zn-plated layer.

[3] The black-plated steel sheet according to [1] or [2], wherein the black oxide of Zn is an oxide of Zn derived from a $Zn_2Mg$ phase.

[4] The black-plated steel sheet according to any one of [1] to [3], further including an inorganic coating film on the hot-dip Al and Mg-containing Zn-plated layer.

[5] The black-plated steel sheet according to [4], wherein the inorganic coating film includes one or more compounds selected from the group consisting of an oxide of valve metal, an oxoate of valve metal, a hydroxide of valve metal, a phosphate of valve metal, and a fluoride of valve metal.

[6] The black-plated steel sheet according to [5], wherein the valve metal is one or more metals selected from the group consisting of Ti, Zr, Hf, V, Nb, Ta, W, Si and Al.

[7] The black-plated steel sheet according to any one of [1] to [3], further including an organic resin coating film on the hot-dip Al and Mg-containing Zn-plated layer.

[8] The black-plated steel sheet according to [7], wherein an organic resin comprised in the organic resin coating film is urethane-based resin obtained by the reaction of polyols consisting of an ether-based polyol and an ester-based polyol with polyisocyanate, a proportion of the ether-based polyol in the polyols being 5 to 30 mass %.

[9] The black-plated steel sheet according to [8], wherein the organic resin coating film further includes a polyvalent phenol.

[10] The black-plated steel sheet according to any one of [7] to [9], wherein the organic resin coating film includes a lubricant.

[11] The black-plated steel sheet according to any one of [7] to [10], wherein the organic resin coating film includes one or more compounds selected from the group consisting of an oxide of valve metal, an oxoate of valve metal, a hydroxide of valve metal, a phosphate of valve metal, and a fluoride of valve metal.

[12] The black-plated steel sheet according to [11], wherein the valve metal is one or more metals selected from the group consisting of Ti, Zr, Hf, V, Nb, Ta, W, Si and Al.

[13] The black-plated steel sheet according to any one of [7] to [12], wherein the organic resin coating film is a laminate layer or a coating layer.

[14] The black-plated steel sheet according to any one of [7] to [13], wherein the organic resin coating film is a clear coating film.

Advantageous Effects of Invention

According to the present invention, a black-plated steel sheet which has black-color appearance with quality design and excellent retention of the black appearance after processing can be produced by blackening treatment in a short time. The produced black-plated steel sheet of the present invention is excellent in design, retention of the appearance, press formability and corrosion resistance, being applicable as a plated steel sheet for, for example, roofing materials and exterior materials of a building, home appliances, and automobiles.

DESCRIPTION OF EMBODIMENTS

1. Black-Plated Steel Sheet

Figure 1A:
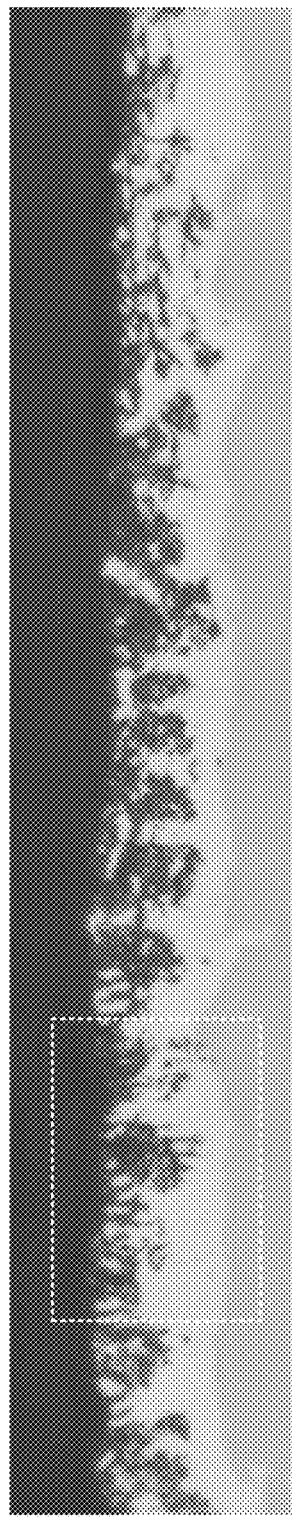
FIG. 1A is an optical microscopic image of the cross section of plating layer of a hot-dip Al and Mg-containing Zn-plated steel sheet after water vapor treatment.

The black-plated steel sheet of the present invention includes a steel substrate and a hot-dip Al and Mg-containing Zn-plating layer (hereinafter also referred to as "plating layer"). The black-plated steel sheet of the present invention may further include an inorganic coating film or an organic resin coating film on the plating layer.

The black plated steel sheet of the present invention has a feature including: 1) a black oxide of Zn being distributed in the plating layer; and 2) the plating layer surface having a lightness L* value of 60 or less (preferably 40 or less, more preferably 35 or less). The lightness (L* value) of a plating layer surface is measured by spectral reflectance with a spectroscopic color difference meter, in accordance with JIS K 5600.

[Steel Substrate]

The type of the steel substrate is not specifically limited. Examples of the steel substrate for use include a steel sheet of low-carbon steel, medium-carbon steel, high-carbon steel, or alloy steel. When the steel substrate is required to have good press formability, use of a steel sheet for deep drawing made of, for example, Ti-added low-carbon steel or Nb-added low-carbon steel is preferred. Alternatively, a high-strength steel sheet with the addition of P, Si and Mn etc. may be used.

[Hot-Dip Al and Mg-Containing Zn-Plating Layer]

As the original plate for the black-plated steel sheet of the present invention, a hot-dip Al and Mg-containing Zn-plated steel sheet is used, including a hot-dip Al and Mg-containing Zn-plated layer which contains 1.0 to 22.0 mass % of Al and 1.3 to 10.0 mass % of Mg, with $Zn_2Mg$ phases distributed in the plating layer. More preferably, a hot-dip Al and Mg-containing Zn-plated steel sheet is used, including a hot-dip Al and Mg-containing Zn-plating layer which further contains a single phase of Al as the microstructure of the plating layer. The term "single phase of Al" means an Al phase having no eutectic structure such as Al" phase with Zn in solid solution state. The single phase of Al is, for example, a primary Al". Al and Mg, i.e. elements for improving the corrosion resistance of a Zn-based plated steel sheet, are essential elements for blackening of the present invention as described in the following. With an Mg content or an Al content less than the lower limit in the range, sufficient corrosion resistance cannot be obtained. In contrast, with a content more than the upper limit, a beautiful plated steel sheet cannot be obtained due to excessive generation of oxides (dross) on a plating bath surface during production of the plated steel sheet.

The hot-dip Al and Mg-containing Zn-plating layer having the composition described above includes a ternary eutectic structure of $Al/Zn/Zn_2Mg$. When the cross section of a plating layer is observed, for example, as in FIGS. 2A to 2C, the proportion of the ternary eutectic structure of $Al/Zn/Zn_2Mg$ in the entire cross section, however is different depending on a plating composition. In the ternary system of Zn—Al—Mg, the eutectic composition includes about 4 mass % of Al and about 3 mass % of Mg. In the case of a plating composition close to the eutectic composition, the ternary eutectic structure of $Al/Zn/Zn_2Mg$ accordingly is a phase having the largest area in the plating cross section, having an area ratio of about 80%. The area ratio, however, decreases as the composition deviates from the eutectic composition, so that a phase other than the ternary eutectic structure of $Al/Zn/Zn_2Mg$ may have the largest area ratio in some cases. Depending on a plating composition, the hot-dip Al and Mg-containing Zn-plating layer further includes a primary Al". The cross sectional schematic view of a plating layer having a plating composition with an Al concentration of 6.0 mass %, an Mg concentration of 3.0 mass %, and a balance of Zn is illustrated, for example, in FIG. 2C. In the plating layer, the ternary eutectic structure of $Al/Zn/Zn_2Mg$ (denoted as "Zn phase" and "$Zn_2Mg$ phase" (including fine Al phase and Zn phase) in the drawing) and the primary crystal structure of Al (denoted as "primary Al"" in the drawing) are mixed. The primary Al" can be clearly discriminated from the Al phase of the ternary eutectic in microscopic observation. Depending on a plating composition, the primary crystal of a plating layer may be formed of a Zn phase, a $Zn_2Mg$ phase, or an $Mg_2Si$ phase, instead of the Al phase.

Figure 2A:
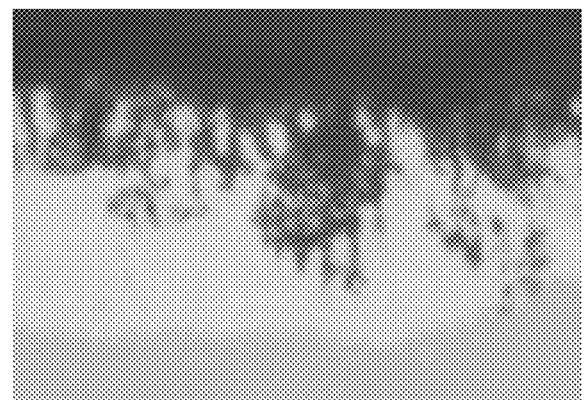
FIG. 2A is an optical microscopic image of the region indicated by dashed lines in FIG. 1A and FIG. 1B.
Figure 2B:
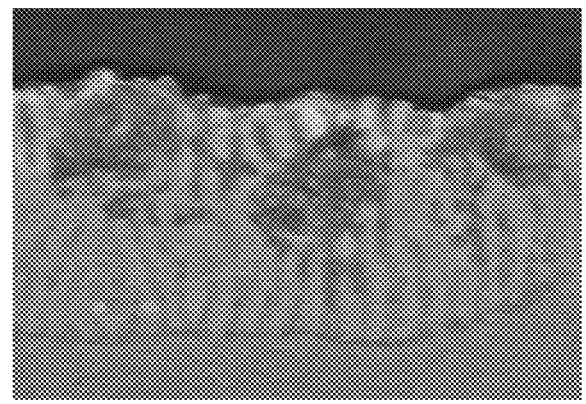
FIG. 2B is a scanning electron microscopic image of the region indicated by dashed lines in FIG. 1A and FIG. 1B.
Figure 2C:
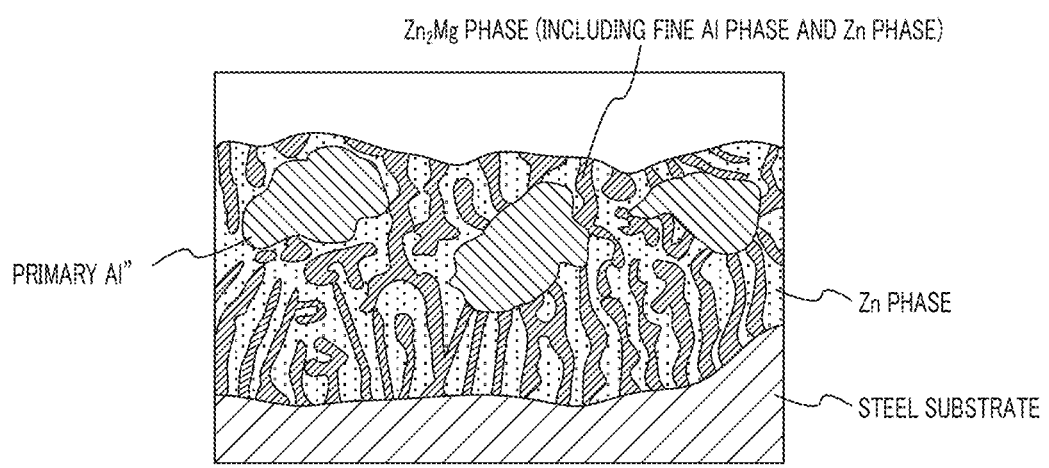
FIG. 2C is a schematic diagram illustrating a microstructure of the region indicated in FIG. 2A and FIG. 2B.

In FIG. 2C, each of the phases (an Al phase, a Zn phase and a $Zn_2Mg$ phase) of the ternary eutectic structure of Al/Zn/Zn$_2$Mg is of irregular size and shape, having a lamellar structure. The lamellar structure means a state having phases alternately arranged to form the eutectic structure, respectively.

The Al phase in the ternary eutectic structure is derived from an Al" phase (an Al solid solution with dissolved Zn, containing a small amount of Mg) at high temperature in a ternary equilibrium phase diagram of Al—Zn—Mg. The Al" phase at high temperature usually forms into fine Al phases and fine Zn phases, which are separated from each other, at normal temperature. The fine Al phases and the fine Zn phases are dispersed in a Zn$_2$Mg phase (In FIG. 2C, the fine Al phases and the fine Zn phases dispersed in a Zn$_2$Mg phase are not shown in the drawing). The Zn phase in the ternary eutectic structure is a Zn solid solution which dissolves a small amount of Al and further dissolves Mg in some cases. The Zn$_2$Mg phase in the ternary eutectic structure is an intermetallic compound phase existing in the vicinity of a point corresponding to about 84 wt % Zn in the binary equilibrium phase diagram of Zn—Mg system. As shown in FIG. 2C, the Zn$_2$Mg phases are distributed in a lamellar form over the entire plating layer. Although the Zn$_2$Mg phase distributed in the plating layer of the hot-dip Al and Mg-containing Zn-plated steel sheet, i.e. the black-plated steel sheet of the present invention, has been so far described for the case of a phase to form a ternary eutectic structure of Al/Zn/Zn$_2$Mg, the phase may emerge to form a binary eutectic structure of Al/Zn$_2$Mg or a binary eutectic structure of Zn/Zn$_2$Mg in the plating layer of the present invention in some cases. Even in the case of a Zn$_2$Mg phase derived from these, the present invention can achieve the effect as long as the Zn$_2$Mg phase forms a eutectic structure. Depending on the cooling conditions and the plating composition of a plating layer, a Zn$_{11}$Mg$_2$ phase may exist in a plating layer in some cases. The presence of the Zn$_{11}$Mg$_2$ phase in the plating layer of the hot-dip Al and Mg-containing Zn-plated steel sheet, i.e. the original plate of the black-plated steel sheet of the present invention, causes no problem. The present invention can achieve the advantageous effect, even in the case, for example, that a portion of the ternary eutectic structure of Al/Zn/Zn$_2$Mg is the ternary eutectic structure of Al/Zn/Zn$_{11}$Mg$_2$.

In the present specification, oxides and hydrated oxides are collectively referred to as an oxide. In the present specification, the content of each component in a plating layer is represented by percentage of the mass of each metal component contained in the plating layer divided by the mass of total metals contained in the plating layer. Accordingly, the mass of oxygen and water contained in oxides is not included in the components in a plating layer. When no elution of metal components occurs during water vapor treatment, the content of each component in the plating layer is, therefore, kept constant before and after water vapor treatment.

The hot-dip Al and Mg-containing Zn-plating layer for use may include, for example, 1.0 to 22.0 mass % Al, 1.3 to 10.0 mass % Mg, and the balance of Zn and unavoidable impurities. In order to improve the adhesion between the steel substrate and the plating layer, Si which can suppress the growth of Al—Fe alloy layer at the interface between the steel substrate and the plating layer, can be added to the plating layer in the range of 0.005 mass % to 2.0 mass %. An Si concentration more than 2.0 mass % may cause generation of Si-based oxides to block blackening on the plating layer surface. Ti, B, a Ti—B alloy, a Ti-containing compound or a B-containing compound may be added to the plating layer. The amount of the compounds to be added is preferably set such that Ti content is 0.001 mass % to 0.1 mass % and B content is 0.0005 mass % to 0.045 mass %. An excessive amount of addition of Ti or B may cause the growth of precipitates on the plating layer. Incidentally, the addition of Ti, B, a Ti—B alloy, a Ti-containing compound or a B-containing compound into a plating layer hardly affects the blackening by water vapor treatment.

The thickness of a plating layer is not specifically limited, preferably in the range of 3 to 100 μm. With a thickness of a plating layer less than 3 μm, scratches easily reach the steel substrate during handling, which may lower the black appearance retention and corrosion resistance. In contrast, with a thickness of a plating layer more than 100 μm, the plating layer may detach from the steel substrate at a processed part due to the difference in ductility between the plating layer and the steel substrate under compression.

[Black Oxides]

Figure 3:
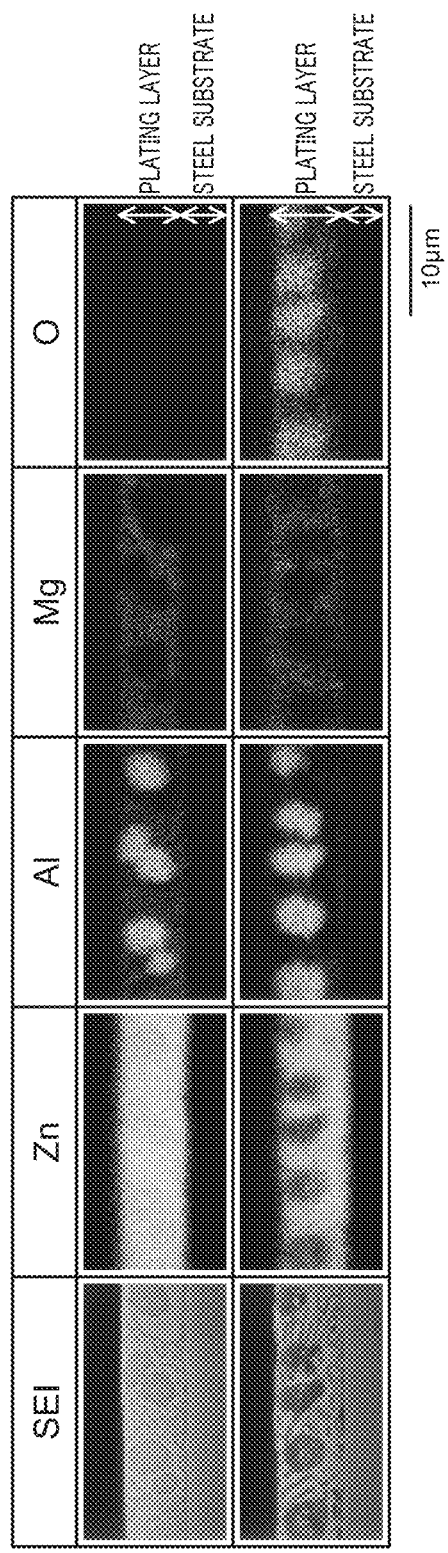
FIG. 3 illustrates element distribution images in the plating layer of a hot-dip Al and Mg-containing Zn-plated steel sheet before and after water vapor treatment.

The black-plated steel sheet of the present invention contains black oxides of Zn distributed in a plating layer (refer to FIG. 1A, FIG. 2A, and FIG. 3). The term "in a plating layer" includes both at the plating layer surface and in the layer interior.

Figure 1B:
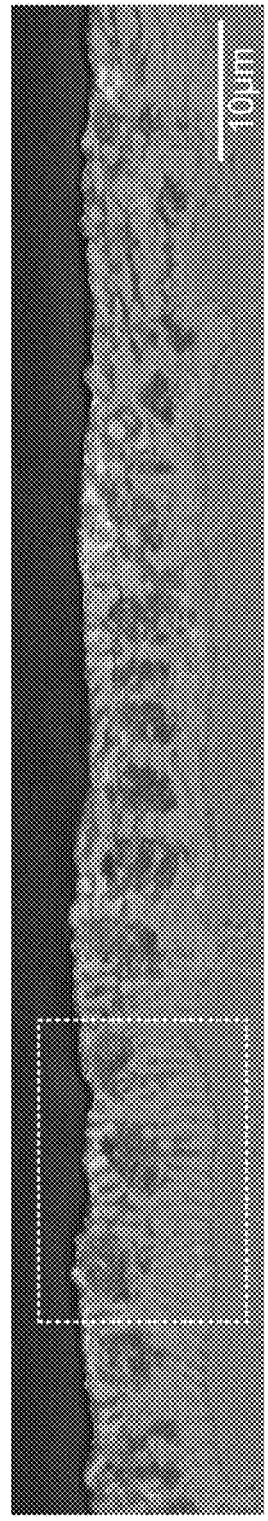
FIG. 1B is a scanning electron microscopic image of a cross section in the same view field as in FIG. 1A.

FIG. 1A is an optical microscopic image showing the cross section of plated layer of the black-plated steel sheet of the present invention. FIG. 1B is a scanning electron microscopic image of the cross section in the same view field as in FIG. 1A. FIG. 2A is an optical microscopic image of the region indicated by dashed lines in FIG. 1A and FIG. 1B. FIG. 2B is a scanning electron microscopic image of the region indicated by dashed lines in FIG. 1A and FIG. 1B. FIG. 2C is a schematic diagram illustrating a microstructure of the region indicated in FIG. 2A and FIG. 2B. In FIG. 2C, for convenience of description, the region of oxidized metal is classified into the same group as before oxidation (a Zn phase, a Zn$_2$Mg phase, and a primary Al") in the drawing.

As illustrated in the drawings, the black-plated steel sheet of the present invention includes black oxides of Zn derived from Zn$_2$Mg phases. The black oxides of Zn are distributed in a lamellar form (Black oxides of Al derived from a primary Al" are to be described in the following). The mechanism for the generation of black oxides of Zn can be assumed as follows.

The hot-dip Al and Mg-containing Zn-plated steel sheet is contacted with water vapor in a closed vessel, so that the oxide layer at the plating layer surface first reacts with H$_2$O to form into hydrated oxide, while H$_2$O passed through the oxide layer reacts with metal in the plating layer. On this occasion, Zn contained in the Zn$_2$Mg phase to constitute the ternary eutectic structure is preferentially oxidized. At time advances, oxidation of Zn contained in the Zn$_2$Mg phase proceeds in the depth direction of the plating layer. Under water vapor atmosphere with low oxygen potential, Mg in the vicinity of oxides of Zn, having high reactivity with oxygen, robs oxides of Zn of oxygen so as to form oxides of Mg. It is believed that the oxides of Zn change into oxygen-deficient oxides with a non-stoichiometric composition (e.g. ZnO$_{1-x}$). In this way, the generation of oxygen-deficient oxide allows light to be trapped in the defect level, so that the oxide has a black appearance. The black plated steel sheet of the present invention, therefore, allows for acceleration of blackening as the Mg content in a plating layer increases, which is different from the black-plated steel sheet of PTL 1. On the other hand, the oxidation reaction of Zn contained in a Zn phase proceeds slowly, so that the most part of Zn remains as metal. As a result, the plating layer of a black-plated steel sheet obtained by the present invention includes a microstructure of black oxides of Zn derived from $Zn_2Mg$ phases. The black oxides of Zn are distributed in a lamellar form. Depending on a plating composition and cooling conditions of the plating layer, $Zn_{11}Mg_2$ phases may also exist in the plating layer in some cases. In this case, Zn contained in the $Zn_{11}Mg_2$ phase is also oxidized, and Mg existing in the circumference is robbed of oxygen, so as to form oxygen-deficient oxides of Zn having a black color.

In the case of a plating layer having primary Al crystals, the black oxides of Zn develop in the interior of the plating layer in a shorter time. Al has higher reactivity with $H_2O$ compared with Zn and Mg. As a result, metal Al coming into contact with water vapor at high temperature rapidly forms into oxides. After Al contained in the primary Al" is rapidly oxidized, oxidation of Zn contained in the $Zn_2Mg$ phase located thereunder proceeds in the depth direction of a plating layer. The Al single phase such as primary Al" thus functions as a "passage" for accelerating the oxidation of Al in the interior of a plating layer. As a result, the presence of an Al single phase such as primary Al" in a plating layer allows for formation of black oxides of Zn in the plating layer for a shorter time. It is presumed that Al in a ternary eutectic also functions as a "passage" for accelerating the oxidation of Zn. With reference to FIG. 2A, it is shown that the depth where the black oxides of Zn exist is different between a region having the primary Al" and a region having no primary Al". As also shown in FIG. 2A, the primary Al" has blackened appearance, since Zn dissolved in solid solution state in the primary Al" is oxidized and the oxidized Zn allows oxygen to be robbed of by Al in the circumference so as to form $ZnO_{1-x}$.

In the black-plated steel sheet described in PTL 1, the surface of a plating layer only is blackened due to generation of needle crystals of $ZnO_{1-x}$. In contrast, in the black-plated steel sheet of the present invention, a layer of black oxides is formed on a plating layer surface and black oxides of Zn are distributed in the interior of a plating layer, based on the reaction mechanism described above. Consequently, the black-plated steel sheet of the present invention can maintain the black appearance even when the plating layer is scratched in processing. The blackened oxides in the interior of the plating layer can be confirmed by optical microscopic observation of the cross section of a plating layer (refer to FIG. 1A and FIG. 2A), or by amalgamating metals Zn, Al and Mg in a plating layer with saturated $HgCl_2$ solution for removal and collecting oxides only. The interior of black oxides in a plated layer may be blackened, or alternatively the surface only may be blackened.

Figure 4A:
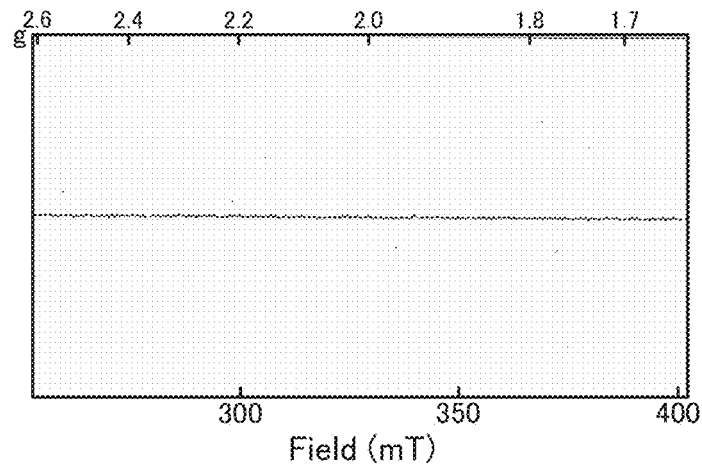
FIG. 4A is an electron spin resonance (ESR) spectrum for a powder sample prepared from the surface of a $Zn_2Mg$ plate before water vapor treatment.
Figure 4B:
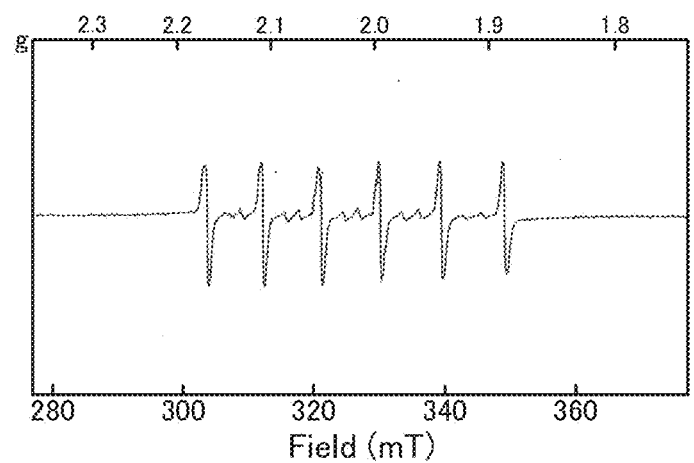
FIG. 4B is an electron spin resonance (ESR) spectrum for a powder sample prepared from the surface of a $Zn_2Mg$ plate after water vapor treatment for blackening.

FIG. 4A is an electron spin resonance (ESR) spectrum for a powder sample prepared from the surface of a $Zn_2Mg$ plate before water vapor treatment. FIG. 4B is an electron spin resonance (ESR) spectrum for a powder sample prepared from the surface of a $Zn_2Mg$ plate after water vapor treatment. The $Zn_2Mg$ plate after water vapor treatment has a black appearance.

With reference to FIG. 4A, no ESR spectrum is observed from $Zn_2Mg$. In contrast, with reference to FIG. 4B, six large peaks are observed. From the positions of the peaks, it is found out that $Zn_2Mg$ after water vapor treatment has unpaired electrons with a nuclear spin of 5/2. The presence of unpaired electrons with a nuclear spin of 5/2 means the presence of crystal structure with defects. From the results shown in FIG. 4B, it is found out that the $Zn_2Mg$ plate having a black appearance after water vapor treatment includes oxygen-deficient oxides. It is also suggested that water vapor treatment of a $Zn_2Mg$-containing plating layer generates blackened oxygen-deficient oxides of Zn as in the present invention.

Figure 5:
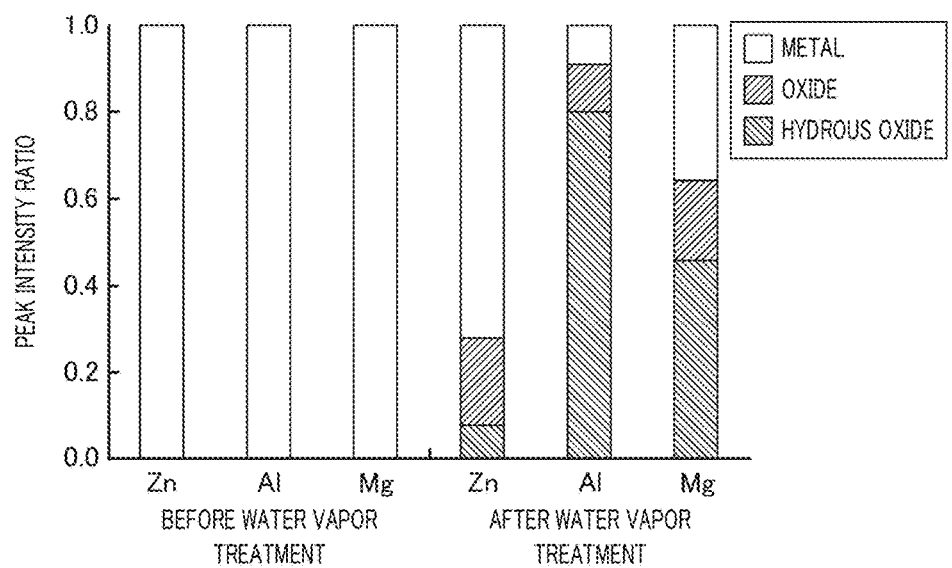
FIG. 5 is a graph illustrating XPS analysis results of the plating layer of a hot-dip Al and Mg-containing Zn-plated steel sheet before and after water vapor treatment.

FIG. 5 is a graph illustrating X-ray photoelectron spectroscopy (XPS) analysis results of the plating layer of a hot-dip Al and Mg-containing Zn-plated steel sheet before and after water vapor treatment. The cross sections of a plating layer before and after water vapor treatment were exposed by oblique cutting for the inspection of the bonding state of Zn, Al and Mg in a region with a diameter of 10 μm approximately at the center of the plating layer. As a result, it was confirmed that oxides (oxides and hydrated oxides) of the respective elements were generated by water vapor treatment as shown in FIG. 5.

[Inorganic Coating Film and Organic Resin Coating Film]

The surface of plating layer of the black-plated steel sheet of the present invention may be applied with an inorganic coating film or an organic resin coating film. The inorganic coating film and the organic resin coating film improve the corrosion resistance and the galling resistance (retention of black appearance) of a black-plated steel sheet.

(Inorganic Coating Film)

The inorganic coating film preferably includes one or more compounds (hereinafter referred to as "valve metal compound") selected from the group consisting of an oxide of valve metal, an oxoate of valve metal, a hydroxide of valve metal, a phosphate of valve metal, and a fluoride of valve metal. Inclusion of a valve metal compound reduces an environmental load and imparts an excellent barrier function. The valve metal means a metal the oxide of which exhibits high insulation resistance. Examples of the valve metal include one or more metals selected from the group consisting of Ti, Zr, Hf, V, Nb, Ta, W, Si, and Al. A known compound may be used as the valve metal compound.

Inclusion of a soluble fluoride of valve metal in an inorganic coating film can impart a self-repairing function. The fluoride of valve metal dissolved in moisture in atmosphere foils oxides or hydroxides having poor solubility, reprecipitating on the steel sheet exposed from defect regions in a coating film so as to bury the defect regions. For inclusion of the soluble fluoride of valve metal in an inorganic coating film, a soluble fluoride of valve metal may be added to the inorganic coating material, or a soluble fluoride such as $(NH_4)F$ may be added in addition to a valve metal compound.

The inorganic coating film may further include a soluble or poorly soluble metal phosphate or complex phosphate. The soluble phosphate eluted from the inorganic coating film to defective regions in a coating film reacts with the metal of a plated steel sheet so as to form an insoluble phosphate, complementing the self-repairing function of valve metal imparted by the soluble fluoride. The poorly soluble phosphate is dispersed in the inorganic coating film so as to improve the strength of the coating film. Examples of the metal contained in the soluble metal phosphate or complex phosphate include an alkali metal, an alkali earth metal and Mn. Examples of the poorly soluble metal phosphate or complex phosphate include Al, Ti, Zr, Hf and Zn.

(Organic Resin Coating Film)

The organic resin for constituting the organic resin coating film may be a urethane-based resin, an epoxy-based resin, an olefin-based resin, a styrene-based resin, a polyester-based resin, an acrylic-based resin, a fluorine-based resin, a combination of these resins, or a copolymer or a modified product of these resins. The use of these organic resins having flexibility prevents occurrence of cracks during forming of a black-plated steel sheet, improving the corrosion resistance. Further, the valve metal compounds included in the organic resin film can be dispersed in the organic resin film (organic resin matrix), as described in the following.

Preferably the organic resin coating film includes a lubricant. Inclusion of a lubricant reduces the friction between a mold and the surface of a plated steel sheet during processing such as pressing so that galling of the plated steel sheet can be suppressed (improvement in galling resistance). The type of lubricant is not specifically limited and may be selected from known lubricants. Examples of the lubricants include an organic wax such as a fluorine-based wax, a polyethylene-based wax, and a styrene-based wax, and an inorganic lubricant such as molybdenum disulfide and talc.

Similarly to an inorganic coating film, the organic resin coating film preferably includes the valve metal compounds described above. Inclusion of a valve metal compound reduces an environmental load and imparts excellent barrier function.

Similarly to an inorganic coating film, the organic resin coating film may further include a soluble or poorly soluble metal phosphate or complex phosphate. The soluble phosphate eluted from the organic coating film to defective regions in a coating film reacts with the metal of a plated steel sheet so as to form an insoluble phosphate, complementing the self-repairing function of valve metal imparted by the soluble fluoride. The poorly soluble phosphate is dispersed in the organic coating film so as to improve the strength of the coating film.

The organic resin coating film including a valve metal compound and a phosphate usually allows for formation of an interface reaction layer between a plated steel sheet and the organic resin coating film. The interface reaction layer is a dense layer formed of zinc fluoride, zinc phosphate, and a fluoride of valve metal or a phosphate which are reaction products of a fluoride or a phosphate contained in an organic coating material with metals contained in the plated steel sheet or a valve metal. The interface reaction layer has excellent environment blocking capability, preventing corrosive components in atmosphere from reaching the plated steel sheet. Meanwhile, the organic resin coating film includes particles of oxide of valve metal, hydroxide of valve metal, fluoride of valve metal and phosphate, which are dispersed in an organic resin matrix. Since the particles of oxides of valve metal are three-dimensionally dispersed in an organic resin matrix, the corrosive components such as moisture passing through the organic resin matrix can be captured. As a result, the organic resin coating film substantially reduces corrosive components reaching the interface reaction layer. Owing to the organic resin coating film and the interface reaction layer, excellent anti-corrosion effect can be achieved.

The organic resin coating film may be, for example, a urethane-based resin coating film which contains urethane based resin having excellent flexibility. The urethane-based resin for constituting the urethane-based resin coating film may be obtained by reacting polyol with polyisocyanate. In the case of treating with water vapor for blackening after formation of the urethane-based resin coating film, the polyol for use preferably includes a combination of an ether-based polyol (polyol having an ether bond) and an ester-based polyol (polyol having an ester bond) at a predetermined ratio.

A urethane-based resin coating film formed of ester-based polyol alone as polyol allows ester bonds in the urethane-based resin to be hydrolyzed by water vapor, so that the corrosion resistance cannot be sufficiently improved. On the other hand, a urethane-based resin coating film formed of ether-based polyol alone as polyol has insufficient adhesion to a plated steel sheet, so that the corrosion resistance cannot be sufficiently improved. In contrast, the present inventors found that use of the combination of an ether-based polyol and an ester-based polyol at a predetermined ratio markedly improves the corrosion resistance of a plated steel sheet, with making effective use of the advantages of both an ether-based polyol and an ester-based polyol, and complementing the disadvantages of each other. The effect of the urethane-based resin coating film for improving the corrosion resistance can be thereby maintained even when treated with water vapor to impart black color (described below) after formation of the urethane-based resin coating film. A black-plated steel sheet which has black color and excellent corrosion resistance can be thus produced.

The type of the ether-based polyol is not specifically limited, and may be properly selected from known ones. Examples of the ether-based polyol include polyethylene glycol, polypropylene glycol, and a straight chain polyalkylene polyol such as an ethylene oxide or propylene oxide adduct of glycerin.

The type of the ester-based polyol is also not specifically limited, and may be properly selected from known ones. The ester-based polyol for use may be, for example, a linear polyester having a hydroxyl group in a molecular chain which is obtained by the reaction of dibasic acid with low-molecular weight polyol. Examples of the dibasic acid include adipic acid, azelaic acid, dodecanedioic acid, dimer acid, isophthalic acid, hexahydro phthalic anhydride, terephthalic acid, dimethyl terephthalate, itaconic acid, fumaric acid, maleic anhydride, and esters of each of the acids.

The proportion of the ether-based polyol in polyol formed of a combination of an ether-based polyol and an ester-based polyol is preferably in the range of 5 to 30 mass %. A proportion of the ether-based polyol less than 5 mass % results in excessively increased proportion of the ester-based polyol, so that the urethane-based resin coating film is easily hydrolyzed. Consequently the corrosion resistance may not be sufficiently improved. On the other hand, a proportion of the ether-based polyol more than 30 mass % results in excessively increased proportion of the ether-based polyol, so that the adhesion to a plated steel sheet is reduced. Consequently the corrosion resistance may not be sufficiently improved.

The type of polyisocyanate is not specifically limited, and may be properly selected from known ones. The polyisocyanate for use may be, for example, a polyisocyanate compound having an aromatic ring. Examples of the polyisocyanate compounds having an aromatic ring include hexamethylene diisocyanate, o-, m-, or p-phenylene diisocyanate, 2,4- or 2,6-tolylene diisocyanate, 2,4- or 2,6-tolylene diisocyanate having a hydrogenated aromatic ring, diphenylmethane-4,4'-diisocyanate, 3,3'-dimethyl-4,4'-biphenylene diisocyanate, ω,ω'-diisocyanate-1,4-dimethylbenzene, and ω,ω'-diisocyanate-1,3-dimethylbenzene. These may be used alone or may be used in combination of two or more.

Preferably the urethane-based resin coating film further includes a polyvalent phenol. A urethane-based resin coating film including a polyvalent phenol allows for formation of a layer of concentrated polyvalent phenol at the interface between a plated steel sheet and the urethane-based resin coating film so as to make strong adhesion between them. Accordingly, blending of polyvalent phenol in the urethane-based resin coating film further improves the corrosion resistance of the urethane-based resin coating film.

The type of polyvalent phenol is not specifically limited and may be properly selected from known ones. Examples of the polyvalent phenol include tannic acid, gallic acid, hydroquinone, catechol, and phloroglucinol. The amount of blended polyvalent phenol in the urethane-based resin coating film is preferably in the range of 0.2 to 30 mass %. An amount of the blended polyvalent phenol less than 0.2 mass % has insufficient effect of the polyvalent phenol. On the other hand, with an amount of the blended polyvalent phenol more than 30 mass %, the stability of the coating material may be reduced.

The organic resin coating film may be a coating layer or a laminate layer. The organic resin coating film is preferably a clear coating film for taking advantage of the black appearance of the black-plated steel sheet.

The black-plated steel sheet of the present invention includes black oxides to impart black color not only on the surface of a plated layer but also in the interior. Accordingly, the black-plated steel sheet of the present invention can maintain the black appearance even when the surface is scraped off, having excellent retention of the black appearance.

The black-plated steel sheet of the present invention includes black oxides for imparting black color which are dispersed in a plated layer without forming one coating film. As a result, the black-plated steel sheet of the present invention has excellent press formability without reduction in adhesion of the plating layer. Of course, the black-plated steel sheet of the present invention also has excellent corrosion resistance similar to that of a normal hot-dip Al and Mg-containing Zn-plated steel sheet.

The black-plated steel sheet of the present invention has no coating film, to which spot welding can be applied as similar to a normal hot-dip Al and Mg-containing Zn-plated steel sheet.

The method for producing the black-plated steel sheet of the present invention is not specifically limited and the black-plated steel sheet of the present invention may be produced, for example, by the following method.

2. Production Method of Black-Plated Steel Sheet

The production method of a black-plated steel sheet of the present invention includes: 1) a first step of preparing a hot-dip Al and Mg-containing Zn-plated steel sheet; and 2) a second step of contacting the Al and Mg-containing Zn-plated steel sheet with water vapor in a closed vessel. The method may further include: 3) a third step of forming an inorganic coating film or organic resin coating film on the surface of the hot-dip Al and Mg-containing Zn-plated steel sheet, before or after the second step as an optional step.

[First Step]

In the first step, the hot-dip Al and Mg-containing Zn-plated steel sheet is prepared.

The hot-dip Al and Mg-containing Zn-plated steel sheet may be produced by hot-dip plating with use of an alloy plating bath including, for example, 1.0 to 22.0 mass % Al, 1.3 to 10.0 mass % Mg, and the balance substantially of Zn. A plating layer formed of 1.0 to 22.0 mass % Al, 1.3 to 10.0 mass % Mg, and the balance of Zn and unavoidable impurities, with $Zn_2Mg$ phases distributed in the plating layer can be thus formed. To the alloy plating bath, Si, Ti, B, a Ti—B alloy, a Ti-containing compound or a B-containing compound may be added. The hot-dip Al and Mg-containing Zn-plated steel sheet can be produced using, for example, a plating bath at a temperature of 430° C., with an air cooling method after plating at an average cooling rate of 11° C./sec from the plating bath temperature to solidification temperature of the plating layer.

[Second Step]

In a second step, the plated steel sheet prepared in the first step is contacted with water vapor in a closed vessel, so that the plated layer is blackened. The process allows the lightness ($L^*$ value) of a plating layer surface to be reduced to 60 or less (preferably 40 or less, more preferably 35 or less). The lightness ($L^*$ value) of a plating layer surface is measured with a spectroscopic color difference meter.

In the second step, the presence of oxygen in the atmosphere for the water vapor treatment prevents a plating layer from being sufficiently blackened. It is presumed that the water vapor treatment in an oxygen-rich atmosphere allows the basic zinc aluminum carbonate having gray color in the surface layer to be more preferentially formed compared to the oxygen-deficient oxides of Zn having black color. In the second step, therefore, it is necessary to reduce the oxygen concentration in the atmosphere (oxygen partial pressure) for water vapor treatment. More specifically, the oxygen concentration in water vapor treatment is preferably 13% or less. The method for lowering the oxygen concentration in the atmosphere is not specifically limited. For example, the water vapor concentration (relative humidity) may be increased, the air in a vessel may be replaced with an inert gas, or the air in a vessel may be removed with a vacuum pump. In any case, the water vapor treatment is required to be performed in a closed vessel.

Figure 6A:
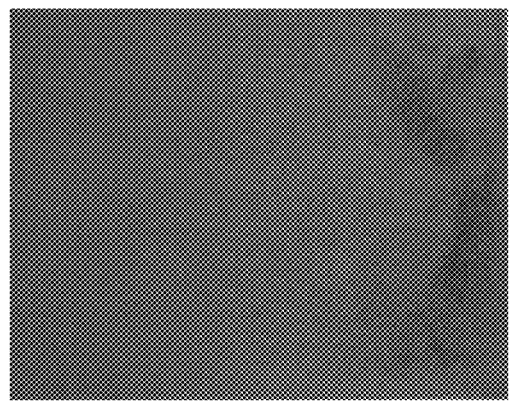
FIG. 6A is a photograph illustrating the surface of a hot-dip Al and Mg-containing Zn-plated steel sheet after water vapor treatment in an open system.
Figure 6B:
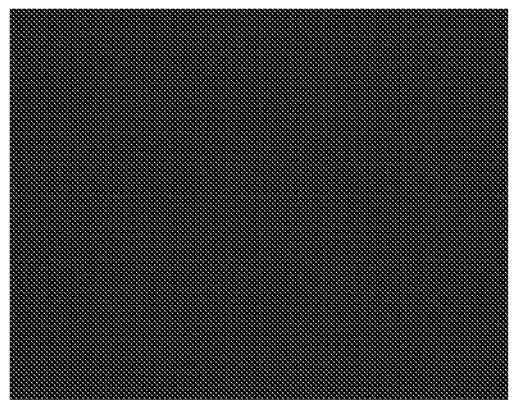
FIG. 6B is a photograph illustrating the surface of a hot-dip Al and Mg-containing Zn-plated steel sheet after water vapor treatment in a closed system.

In the production method of a black-plated steel sheet described in PTL 1, high-temperature water vapor is sprayed to the surface of a plated steel sheet. It is accordingly believed that the water vapor treatment is performed in an open system the oxygen concentration of which cannot be adjusted. The plating layer cannot be, however, sufficiently blackened by the water vapor treatment of the hot-dip Al and Mg-containing Zn-plated steel sheet prepared in the step 1 in an open system the oxygen concentration of which cannot be adjusted. FIG. 6A and FIG. 6B are photographs illustrating the results of water vapor treatment of a hot-dip Al and Mg-containing Zn-plated steel sheet having a plating composition with an Al concentration of 6.0 mass %, an Mg concentration of 3.0 mass %, and the balance of Zn. FIG. 6A is a photograph illustrating the hot-dip Al and Mg-containing Zn-plated steel sheet after spraying water vapor at 98° C. for 60 hours in an open system with an oxygen concentration more than 13% ($L^*$ value: 62). FIG. 6B is a photograph illustrating the hot-dip Al and Mg-containing Zn-plated steel sheet after contacting with water vapor at 140° C. for 4 hours in a closed system with an oxygen concentration of 13% or less ($L^*$ value: 32). The photographs indicate that the water vapor treatment is required to be performed in a closed system the oxygen concentration of which can be adjusted for sufficient blackening of the hot-dip Al and Mg-containing Zn-plated layer.

(Treatment Temperature)

The temperature for water vapor treatment is preferably in the range of 50° C. or higher and 350° C. or lower. In the case of a temperature for water vapor treatment below 50° C., the productivity is lowered due to a slow blackening rate. More preferably the temperature for water vapor treatment is 100° C. or higher, since the oxygen concentration in the atmosphere can be easily lowered when water is heated to 100° C. or higher in a closed vessel so as to have a pressure in the vessel of 1 atmospheric pressure or higher. In contrast, in the case of a temperature for water vapor treatment higher than 350° C., the control is difficult due to an extremely high blackening rate. Furthermore, not only a large-sized processing apparatus is required, but also prolonged total processing time is required including the time required for raising and lowering temperature, which is impractical. Accordingly, a temperature for water vapor treatment in the range of 105° C. or higher and 200° C. or lower is particularly preferred, from the viewpoints of removal of oxygen in the atmosphere and control of the blackening rate.

When a temperature lower than 100° C. is required for water vapor treatment, an inert gas at an atmospheric pressure or higher may be contained in the vessel so as to prevent air from being mixed. The type of inert gas is not specifically limited as long as not involving the blackening reaction. Examples of the inert gas include Ar, $N_2$, He, Ne, Kr and Xe. Among these, Ar, $N_2$ and He are preferred, being available at low cost. Alternatively, the water vapor treatment may be performed after removal of air in the vessel by a vacuum pump or the like.

(Relative Humidity)

In water vapor treatment, the relative humidity of water vapor is preferably in the range of 30% or more and 100% or less, more preferably in the range of 30% or more and less than 100%. A relative humidity of water vapor less than 30% reduces productivity due to a slow blackening rate. A relative humidity of water vapor of 100% may easily cause defects in appearance due to attachment of dew condensation water to the surface of a plated steel sheet.

The processing time for water vapor treatment may be properly set depending on the conditions for the water vapor treatment (temperature, relative humidity, pressure and the like), the amount of Al and Mg in a plating layer, and the lightness to be required.

(Preheating)

Prior to water vapor treatment, a plated steel sheet may be heated to form $Zn_{11}Mg_2$ from $Zn_2Mg$ in the plating layer, so that the time for water vapor treatment for obtaining black appearance of the plating layer can be shortened. The heating temperature of the plated steel sheet is preferably in the range of 150 to 350° C. A heating temperature lower than 150° C. prolongs the processing time for forming $Zn_{11}Mg_2$ from $Zn_2Mg$ by preheating, so that the advantage of shortening the time of water vapor treatment cannot be obtained. In contrast, although a heating temperature higher than 350° C. allows for the change of $Zn_2Mg$ to $Zn_{11}Mg_2$ in a short time, the further progress of reaction may form a plating layer having lower corrosion resistance due to separation of each of the phases with progress of the change in the state of the plated layer, so that the preheating cannot be easily controlled. The processing time for the preheating may be properly set depending on the processing temperature and the amount of Al and Mg in the plating layer. The preheating may be typically performed at 250° C. for about 2 hours.

The water vapor treatment may be applied to any of a plated steel sheet wound in a coil form, a flat plated steel sheet before processing, and a plated steel sheet after molding or welding.

[Optional Step]

In an optional step optionally performed before or after the second step, an inorganic coating film or an organic resin coating film is formed on the surface of a hot-dip Al and Mg-containing Zn-plated steel sheet.

The inorganic coating film may be formed by a known method. For example, an inorganic coating material which contains a valve metal may be applied to the surface of a hot-dip Al and Mg-containing Zn-plated steel sheet before or after contact with water vapor, and then dried without washing with water. Examples of the application method include a roll coating method, a spin coating method, and a spray coating method. In the case of adding a valve metal compound to an inorganic coating material, an organic acid having a chelating function may be added to the inorganic coating material so that the valve metal compound can stably exist in the inorganic coating material. Examples of the organic acid include tannic acid, tartaric acid, citric acid, oxalic acid, malonic acid, lactic acid, and acetic acid.

An organic resin coating film may be also formed by a known method. In the case of an organic resin coating film formed of, for example, coating layer, an organic coating material which contains an organic resin and a valve metal may be applied to the surface of a hot-dip Al and Mg-containing Zn-plated steel sheet before or after contact with water vapor, and then dried without washing with water. Examples of the application method include a roll coating method, a spin coating method, and a spray coating method. In the case of adding a valve metal compound to an organic coating material, an organic acid having a chelating function may be added to the organic coating material so that the valve metal compound can stably exist in the organic coating material. In the case of application of an organic coating material which contains an organic resin, a valve metal compound, a fluoride, and a phosphate to the surface of a plated steel sheet, a coating film (interface reaction layer) including a reaction product of inorganic negative ions such as fluorine ions and phosphoric ions with metals contained in the plated steel sheet or a valve metal is preferentially and densely formed on the surface of the plated steel sheet, on which an organic resin coating film including dispersed particles of oxides of valve metal, hydroxides of valve metal, fluorides of valve metal and phosphates is formed. In contrast, in the case of the organic resin coating film formed of a laminate layer, an organic resin film which contains a valve metal or the like may be laminated on the surface of a plated steel sheet.

In the case of forming an organic resin coating film on the surface of a hot-dip Al and Mg-containing Zn-plated steel sheet before contacting the hot-dip Al and Mg-containing Zn-plated steel sheet with water vapor, the organic resin coating film is preferably the urethane-based resin coating film. The urethane-based resin coating film formed from polyol including a combination of an ether-based polyol and an ester-based polyol at a predetermined ratio can maintain the effect for improving the corrosion resistance even when treated with water vapor. A black-plated steel sheet having black color and excellent corrosion resistance can be therefore produced, even when the second step is performed after any step.

According to the procedures described above, a plating layer can be blackened to produce a black-plated steel sheet excellent in retention of the black appearance and press formability.

The production method of the present invention uses water vapor for blackening, so that a black-plated steel sheet can be produced without placing a load to the environment.

EXAMPLES

The following examples further illustrate the present invention, but the scope of the present invention is not limited to the examples.

Example 1

A hot-dip Al and Mg-containing Zn-plated steel sheet having a plating layer with a thickness of 3 to 100 μm was prepared from a substrate of SPCC with a sheet thickness of 1.2 mm. The plating bath composition (concentration of Zn, Al and Mg) was changed to prepare 20 kinds of plated steel sheets, each of which had a plating layer with a different composition and a different thickness. The plating bath composition and the plating layer thickness for each of the 20 kinds of prepared plated steel sheets are shown in Table 1. The plating bath composition and the plating layer composition are the same.

TABLE 1

| Plated steel sheet No. | Plating bath composition (mass %) | | Plating layer thickness (µm) |
|---|---|---|---|
| | Al | Mg | |
| 1 | 1.0 | 3.0 | 15 |
| 2 | 6.0 | 3.0 | 15 |
| 3 | 11.0 | 3.0 | 15 |
| 4 | 22.0 | 3.0 | 15 |
| 5 | 6.0 | 1.3 | 15 |
| 6 | 6.0 | 10.0 | 15 |
| 7 | 1.8 | 1.9 | 15 |
| 8 | 3.7 | 3.1 | 15 |
| 9 | 2.3 | 2.2 | 15 |
| 10 | 4.0 | 3.3 | 15 |
| 11 | 6.0 | 3.0 | 18 |
| 12 | 6.0 | 3.0 | 3 |
| 13 | 6.0 | 3.0 | 6 |
| 14 | 6.0 | 3.0 | 10 |
| 15 | 6.0 | 3.0 | 30 |
| 16 | 6.0 | 3.0 | 100 |
| 17 | 0.5 | 3.0 | 15 |
| 18 | 30.0 | 3.0 | 15 |
| 19 | 6.0 | 1.1 | 15 |
| 20 | 6.0 | 15.0 | 15 |

The cross section of a plating layer was observed by a scanning electron microscope and analyzed by X-ray diffraction for identification of phases for each of the plated steel sheets Nos. 1 to 16. As a result, a ternary eutectic structure of Al/Zn/$Zn_2Mg$ was found in any of the plating textures. An Al primary crystal was also found in the plating texture of Nos. 2 to 5. The primary crystal of the plated steel sheets No. 1 and Nos. 7 to 9 was Zn, and the primary crystal of the plated steel sheet No. 6 was $Zn_2Mg$. The ternary eutectic structure of Al/Zn/$Zn_2Mg$ only was found in the plated steel sheet No. 10. In contrast, the ternary eutectic of Al/Zn/$Zn_2Mg$, the primary crystal of Zn, and a binary eutectic structure of Zn/$Zn_2Mg$ were found in the plated steel sheet No. 17. The ternary eutectic structure of Al/Zn/$Zn_2Mg$ was found in each of the plated steel sheets Nos. 18 to 20. The primary crystal was Al in Nos. 18 and 19, and $Zn_2Mg$ phase in No. 20.

The prepared plated steel sheet was placed in a high-temperature and high-pressure heat-moisture treatment apparatus (made by Hisaka Works, Ltd.), and the plating layer was contacted with water vapor under the conditions shown in Table 2.

FIG. 1A is an optical microscopic image of the cross section of plated layer of the plated steel sheet after water vapor treatment in Example 21. FIG. 1B is a scanning electron microscopic image of a cross section in the same view field as in FIG. 1A. FIG. 2A is an optical microscopic image of the region indicated by dashed lines in FIG. 1A and FIG. 1B. FIG. 2B is a scanning electron microscopic image of the region indicated by dashed lines in FIG. 1A and FIG. 1B. FIG. 2C is a schematic diagram illustrating a microstructure of the region indicated in FIG. 2A and FIG. 2B. In FIG. 2C, for convenience of description, the region of oxidized metal is also classified into the same group as before oxidation (a Zn phase, a $Zn_2Mg$ phase, and a primary Al") in the drawing. As illustrated in the photographs, the $Zn_2Mg$ phase distributed in a lamellar form is blackened. It was observed that in each of the plating layers of the plated steel sheets in other Examples (Examples 1 to 20, and 22 to 23), the $Zn_2Mg$ phases distributed in a lamellar form were blackened also in the interior of the plating layer.

In FIG. 1A, the blackened part has a depth of about 8 µm, so that it was confirmed that blackening reached a deeper layer in the plating layer. In other Examples, blackening also reached a deeper layer of the plated steel sheet. In order to examine the adhesion of the black-plated steel sheet after processing, a 180 degree bending test was also performed for each of the plated steel sheet after water vapor treatment (Examples 1 to 23). In the 180 degree bending test, a sample piece cut out from each of the plated steel sheets was bent at 180 degrees (3 t), and a cellophane tape peeling test was performed for the bent part. As a result, no peeling was found for any one in Examples 1 to 23. It was, therefore, demonstrated that the black-plated steel sheet of the present invention has excellent adhesion even when processed. It was also confirmed that the $Zn_2Mg$ phases dispersed in a plating layer in Comparative Examples 1 to 4 were blackened.

FIG. 3 illustrates element distribution images of plated steel sheet before and after water vapor treatment in Example 20 (plated steel sheet No. 13) analyzed by electron probe micro analyzer (EPMA). In the upper row, the cross sections of the plated steel sheet No. 13 before water vapor treatment are shown, and in the lower row, the cross sections of the plated steel sheet after water vapor treatment in Example 20 are shown. The visual field in the photographs is different between before and after water vapor treatment. "SEI" represents secondary electron images, "Zn" represents Zn distribution images, "Al" represents Al distribution images, "Mg" represents Mg distribution images, and "O" represents O distribution images. From the results, it was found that Zn contained in the primary Al" and Zn contained in the $Zn_2Mg$ phase were mainly oxidized. In plated steel sheets in other Examples (Examples 1 to 19, and 21 to 23), Zn contained in the $Zn_2Mg$ phase and Zn contained in the primary Al" were also oxidized. On the other hand, also in Comparative Examples 1 to 4, O (oxygen) was distributed after water vapor treatment, and it was confirmed that Zn contained in the primary Al" and Zn contained in the $Zn_2Mg$ phase were oxidized.

The lightness (L* value) of a plating layer surface was measured for each of the plated steel sheets after water vapor treatment (Examples 1 to 23, and Comparative Examples 1 to 4) by spectral reflectance with a spectroscopic color difference meter (TC-1800, made by Tokyo Denshoku Co., Ltd.), in accordance with JIS K 5600. The measurement conditions are shown in the following:

Optical conditions: d/8° method (double beam optical system)
Visual field: 2 degrees
Measurement method: reflectometry
Standard light: C
Color system: CIELAB
Measurement wavelength: 380 to 780 nm
Measurement wavelength interval: 5 nm
Spectroscope: diffraction grating 1,200/mm
Lighting: halogen lamp (voltage: 12 V, power: 50 W, rated life: 2,000 hours)
Measurement area: diameter=7.25 mm Detection element: photomultiplier (R928 made by Hamamatsu Photonics K.K.)

Reflectance: 0 to 150%

Measurement temperature: 23° C.

Standard plate: white

For each of the plated steel sheets after water vapor treatment (Examples 1 to 23 and Comparative Examples 1 to 4), having an L* value of 35 or less was evaluated as "A", more than 35 and 40 or less as "B", more than 40 and 60 or less as "C", and more than 60 as "D".

The corrosion resistance was evaluated for each of the plated steel sheets after water vapor treatment (Examples 1 to 23 and Comparative Examples 1 to 4). After sealing the end faces of a sample piece (150 mm long and 70 mm wide) cut out from each of the plated steel sheets, the sample piece was subjected to repeated cycles including a salt water spraying step, a drying step, and a moistening step in one cycle (8 hours). Evaluation was made based on the number of cycles when the proportion of red-rusted area reached 5%. In the salt water spraying step, 5% NaCl aqueous solution at 35° C. was sprayed to the sample piece for 2 hours. In the drying step, the sample piece was left standing for 4 hours in an environment at an atmospheric temperature of 60° C. and a relative humidity of 30%. In the moistening step, the sample piece was left standing for 2 hours in an environment at an atmospheric temperature of 50° C. and a relative humidity of 95%. The sample piece which requires more than 120 cycles for the proportion of red-rusted area to reach 5% was evaluated as "A", more than 70 cycles and 120 or less as "B", and 70 cycles or less as "D".

The lightness and the results of corrosion resistance testing for the plating layer surface of each of the plated steel sheets after water vapor treatment are shown in Table 2.

As shown in Table 2, the plated steel sheets in Comparative Examples 1 and 3 had a plating layer with reduced corrosion resistance due to the content of Al or Mg in the plating layer beyond the proper range. The plated steel sheets in Comparative Examples 2 and 4 were not beautifully plated, since excessive generation of oxides (dross) on a plating bath surface during production of the plated steel sheet caused attachment of the dross to the plating layer surface.

The results proved that the black-plated steel sheet of the present invention has a high degree of blackness, being excellent in the corrosion resistance and the retention of black appearance after processing.

Example 2

A hot-dip Al and Mg-containing Zn-plated steel sheet having a plating layer with a thickness of 10 μm was prepared from a substrate of SPCC with a sheet thickness of 1.2 mm. The plating bath composition (concentration of Zn, Al, Mg, Si, Ti and B) was changed to prepare 35 kinds of plated steel sheets, each of which had a plating layer with a different composition. The plating bath composition and the plating layer thickness for each of the 35 kinds of prepared plated steel sheet are shown in Table 3. The plating bath composition and the plating layer composition are the same.

TABLE 2

|  | Plated steel sheet (refer to Table 1) | Conditions for contacting with water vapor ||||  Blackness degree Lightness (L* value) | Corrosion resistance Cycle number (repeat count) |
|  |  | Temperature (° C.) | Relative humidity (%) | Oxygen concentration (%) | Treatment time (hour) |  |  |
| --- | --- | --- | --- | --- | --- | --- | --- |
| Example 1 | 1 | 120 | 85 | 3 | 20 | 34(A) | 110(B) |
| Example 2 | 2 | 120 | 85 | 3 | 20 | 33(A) | 120 < (A) |
| Example 3 | 3 | 120 | 85 | 3 | 20 | 31(A) | 120 < (A) |
| Example 4 | 4 | 120 | 85 | 3 | 20 | 30(A) | 120 < (A) |
| Example 5 | 5 | 120 | 85 | 3 | 20 | 32(A) | 85(B) |
| Example 6 | 6 | 120 | 85 | 3 | 20 | 33(A) | 120 < (A) |
| Example 7 | 7 | 120 | 85 | 3 | 20 | 35(A) | 90(B) |
| Example 8 | 8 | 120 | 85 | 3 | 20 | 32(A) | 120 < (A) |
| Example 9 | 9 | 120 | 85 | 3 | 20 | 33(A) | 90(B) |
| Example 10 | 10 | 120 | 85 | 3 | 20 | 31(A) | 120 < (A) |
| Example 11 | 11 | 105 | 98 | 0.4 | 20 | 42(C) | 120 < (A) |
| Example 12 | 11 | 105 | 35 | 13 | 115 | 55(C) | 120 < (A) |
| Example 13 | 11 | 130 | 95 | 1 | 8 | 38(B) | 120 < (A) |
| Example 14 | 11 | 145 | 85 | 3 | 8 | 31(A) | 120 < (A) |
| Example 15 | 11 | 190 | 70 | 6 | 1 | 29(A) | 120 < (A) |
| Example 16 | 11 | 210 | 90 | 2 | 0.5 | 32(A) | 120 < (A) |
| Example 17 | 11 | 260 | 100 | 0.05 | 0.2 | 31(A) | 120 < (A) |
| Example 18 | 11 | 340 | 100 | 0.05 | 0.1 | 28(A) | 120 < (A) |
| Example 19 | 12 | 120 | 85 | 3 | 20 | 31(A) | 73(B) |
| Example 20 | 13 | 120 | 85 | 3 | 20 | 32(A) | 120 < (A) |
| Example 21 | 14 | 120 | 85 | 3 | 20 | 32(A) | 120 < (A) |
| Example 22 | 15 | 120 | 85 | 3 | 20 | 33(A) | 120 < (A) |
| Example 23 | 16 | 120 | 85 | 3 | 20 | 34(A) | 120 < (A) |
| Comparative Example 1 | 17 | 120 | 85 | 3 | 20 | 38(B) | 68(D) |
| Comparative Example 2 | 18 | 120 | 85 | 3 | 20 | 31(A) | 120 < (A) |
| Comparative Example 3 | 19 | 120 | 85 | 3 | 20 | 33(A) | 48(D) |
| Comparative Example 4 | 20 | 120 | 85 | 3 | 20 | 31(A) | 120 < (A) |

TABLE 3

| Plated steel sheet No. | Plating bath composition (mass %) | | | | | Plating layer thickness (μm) |
|---|---|---|---|---|---|---|
| | Al | Mg | Si | Ti | B | |
| 21 | 6.0 | 3.0 | 0.005 | — | — | 10 |
| 22 | 6.0 | 3.0 | 0.020 | — | — | |
| 23 | 6.0 | 3.0 | 0.200 | — | — | |
| 24 | 6.0 | 3.0 | 2.000 | — | — | |
| 25 | 6.0 | 3.0 | — | 0.001 | — | |
| 26 | 6.0 | 3.0 | — | 0.002 | — | |
| 27 | 6.0 | 3.0 | — | 0.100 | — | |
| 28 | 6.0 | 3.0 | — | — | 0.0005 | |
| 29 | 6.0 | 3.0 | — | — | 0.045 | |
| 30 | 6.0 | 3.0 | — | 0.001 | 0.0005 | |
| 31 | 6.0 | 3.0 | — | 0.001 | 0.045 | |
| 32 | 6.0 | 3.0 | — | 0.100 | 0.0005 | |
| 33 | 6.0 | 3.0 | — | 0.100 | 0.045 | |
| 34 | 6.0 | 3.0 | — | 0.002 | 0.0005 | |
| 35 | 6.0 | 3.0 | 0.020 | 0.020 | — | |
| 36 | 6.0 | 3.0 | 0.020 | 0.020 | 0.0005 | |
| 37 | 11.0 | 3.0 | 0.005 | — | — | |
| 38 | 11.0 | 3.0 | 0.020 | — | — | |
| 39 | 11.0 | 3.0 | 0.200 | — | — | |
| 40 | 11.0 | 3.0 | 2.000 | — | — | |
| 41 | 11.0 | 3.0 | — | 0.001 | — | |
| 42 | 11.0 | 3.0 | — | 0.002 | — | |
| 43 | 11.0 | 3.0 | — | 0.100 | — | |
| 44 | 11.0 | 3.0 | — | — | 0.0005 | |
| 45 | 11.0 | 3.0 | — | — | 0.045 | |
| 46 | 11.0 | 3.0 | — | 0.001 | 0.0005 | |
| 47 | 11.0 | 3.0 | — | 0.001 | 0.045 | |
| 48 | 11.0 | 3.0 | — | 0.100 | 0.0005 | |
| 49 | 11.0 | 3.0 | — | 0.100 | 0.045 | |
| 50 | 11.0 | 3.0 | — | 0.002 | 0.0005 | |
| 51 | 11.0 | 3.0 | 0.200 | 0.002 | — | |
| 52 | 11.0 | 3.0 | 0.200 | 0.002 | 0.0005 | |
| 53 | 1.8 | 1.9 | 0.006 | 0.002 | — | |
| 54 | 2.3 | 2.3 | 0.005 | — | — | |
| 55 | 3.8 | 3.2 | 0.005 | — | — | |

The prepared plated steel sheet was placed in a high-temperature and high-pressure heat-moisture treatment apparatus, and the plating layer was contacted with water vapor under the conditions shown in Table 4.

The cross section of a plating layer was observed for each of the plated steel sheets after water vapor treatment (Examples 24 to 58) with an optical microscope. It was observed that the $Zn_2Mg$ phases distributed in the plating layer were blackened even in the interior of the plating layer.

The lightness (L* value) of a plating layer surface was measured for each of the plated steel sheets after water vapor treatment (Examples 24 to 58) with a spectroscopic color difference meter. The corrosion resistance testing was also performed for each of the plated steel sheets after water vapor treatment (Examples 24 to 58). The measurement of the lightness and the corrosion resistance testing were performed in the same way as in Example 1. The lightness and the results of corrosion resistance testing for the plating layer surface of each of the plated steel sheets after water vapor treatment are shown in Table 4.

TABLE 4

| | Plated steel sheet (refer to Table 3) | Conditions for contacting with water vapor | | | | Blackness degree Lightness (L* value) | Corrosion resistance Cycle number (repeat count) |
|---|---|---|---|---|---|---|---|
| | | Temperature (° C.) | Relative humidity (%) | Oxygen concentration (%) | Treatment time (hour) | | |
| Example 24 | 21 | 110 | 80 | 4 | 28 | 32(A) | 120 < (A) |
| Example 25 | 22 | 110 | 80 | 4 | 28 | 32(A) | 120 < (A) |
| Example 26 | 23 | 110 | 80 | 4 | 28 | 32(A) | 120 < (A) |
| Example 27 | 24 | 110 | 80 | 4 | 28 | 32(A) | 120 < (A) |
| Example 28 | 25 | 110 | 80 | 4 | 28 | 32(A) | 120 < (A) |
| Example 29 | 26 | 110 | 80 | 4 | 28 | 32(A) | 120 < (A) |
| Example 30 | 27 | 110 | 80 | 4 | 28 | 32(A) | 120 < (A) |
| Example 31 | 28 | 110 | 80 | 4 | 28 | 32(A) | 120 < (A) |
| Example 32 | 29 | 110 | 80 | 4 | 28 | 32(A) | 120 < (A) |
| Example 33 | 30 | 110 | 80 | 4 | 28 | 32(A) | 120 < (A) |
| Example 34 | 31 | 110 | 80 | 4 | 28 | 32(A) | 120 < (A) |
| Example 35 | 32 | 110 | 80 | 4 | 28 | 32(A) | 120 < (A) |
| Example 36 | 33 | 110 | 80 | 4 | 28 | 32(A) | 120 < (A) |
| Example 37 | 34 | 110 | 80 | 4 | 28 | 32(A) | 120 < (A) |
| Example 38 | 35 | 110 | 80 | 4 | 28 | 32(A) | 120 < (A) |
| Example 39 | 36 | 110 | 80 | 4 | 28 | 32(A) | 120 < (A) |
| Example 40 | 37 | 110 | 85 | 3 | 28 | 30(A) | 120 < (A) |
| Example 41 | 38 | 110 | 85 | 3 | 28 | 30(A) | 120 < (A) |
| Example 42 | 39 | 110 | 85 | 3 | 28 | 30(A) | 120 < (A) |
| Example 43 | 40 | 110 | 85 | 3 | 28 | 30(A) | 120 < (A) |
| Example 44 | 41 | 110 | 85 | 3 | 28 | 30(A) | 120 < (A) |
| Example 45 | 42 | 110 | 85 | 3 | 28 | 30(A) | 120 < (A) |
| Example 46 | 43 | 110 | 85 | 3 | 28 | 30(A) | 120 < (A) |
| Example 47 | 44 | 110 | 85 | 3 | 28 | 30(A) | 120 < (A) |
| Example 48 | 45 | 110 | 85 | 3 | 28 | 30(A) | 120 < (A) |
| Example 49 | 46 | 110 | 85 | 3 | 28 | 30(A) | 120 < (A) |
| Example 50 | 47 | 110 | 85 | 3 | 28 | 30(A) | 120 < (A) |
| Example 51 | 48 | 110 | 85 | 3 | 28 | 30(A) | 120 < (A) |
| Example 52 | 49 | 110 | 85 | 3 | 28 | 30(A) | 120 < (A) |
| Example 53 | 50 | 110 | 85 | 3 | 28 | 30(A) | 120 < (A) |

TABLE 4-continued

|  | Plated steel sheet (refer to Table 3) | Conditions for contacting with water vapor | | | | Blackness degree Lightness (L* value) | Corrosion resistance Cycle number (repeat count) |
|---|---|---|---|---|---|---|---|
|  |  | Temperature (° C.) | Relative humidity (%) | Oxygen concentration (%) | Treatment time (hour) |  |  |
| Example 54 | 51 | 110 | 85 | 3 | 28 | 30(A) | 120 < (A) |
| Example 55 | 52 | 110 | 85 | 3 | 28 | 30(A) | 120 < (A) |
| Example 56 | 53 | 110 | 80 | 4 | 28 | 36(B) | 74(B) |
| Example 57 | 54 | 110 | 80 | 4 | 28 | 35(A) | 78(B) |
| Example 58 | 55 | 110 | 80 | 4 | 28 | 34(A) | 120 < (A) |

As shown in Table 4, the plated steel sheets in Examples 24 to 58 were sufficiently blackened and had good results in corrosion resistance of the plating layer. A 180 degree bending test was also performed for each of the plated steel sheets after water vapor treatment (Examples 24 to 58). In the 180 degree bending test, a sample piece cut out from each of the plated steel sheets was bent at 180 degrees (3 t), and the cellophane tape peeling test was performed for the bent part. As a result, no peeling was found for any one in Examples 24 to 58.

The results proved that the black-plated steel sheet of the present invention has a high degree of blackness, being excellent in the corrosion resistance and the retention of black appearance after processing.

Example 3

A plated steel sheet No. 36 or 52 in Table 3 was coated with an inorganic chemical treatment liquid shown in Table 5, and placed in an electric oven without washing with water so as to be heated and dried under conditions for the plate temperature to reach 120° C. Consequently an inorganic coating film was formed on the surface of the plated steel sheet.

The prepared plated steel sheet having the inorganic coating film was placed in a high-temperature and high-pressure heat-moisture treatment apparatus, and the plating layer was contacted with water vapor under the conditions shown in Tables 6 and 7.

The cross section of a plating layer was observed for each of the plated steel sheets after water vapor treatment (Examples 59 to 90) with an optical microscope. It was observed that the $Zn_2Mg$ phases distributed in a lamellar form mainly in the ternary eutectic structure were blackened. It was confirmed that partially crystallized $Zn_2Mg$ phases and $Zn_2Mg$ phases of the binary eutectic of $Al/Zn_2Mg$ were also blackened.

The lightness (L* value) of a plating layer surface was measured for each of the plated steel sheets after water vapor treatment (Examples 59 to 90) with a spectroscopic color difference meter in the same way as in Example 1. The corrosion resistance testing was also performed for each of the plated steel sheets after water vapor treatment (Examples 59 to 90). In the corrosion resistance testing, NaCl aqueous solution at 35° C. was sprayed to the sample piece for 12 hours in accordance with JIS Z 2371. The sample piece with a proportion of white-rusted area after spraying of 0% was

TABLE 5

| Treatment liquid No. | Valve metal compound | | Phosphate | | Organic acid | |
|---|---|---|---|---|---|---|
|  | Type | Concentration (g/L) | Type | Concentration (g/L) | Type | Concentration (g/L) |
| 1 | $H_2TiF_6$ | Ti: 2 | $H_3PO_4$ | P: 10 | — | — |
| 2 | $(NH_4)_2TiF_6$ | Ti: 6 | $H_3PO_4$ | P: 10 | — | — |
| 3 | $H_2TiF_6$ | Ti: 8 | — | — | Tannic acid | 10 |
| 4 | $(NH_4)VO_3$ | V: 5 | — | — | — | — |
| 5 | $V_2O_5$ $(NH_4)_2ZrO(CO_3)_2$ | V: 5 Zr: 6 | $H_3PO_4$ | P: 10 | — | — |
| 6 | $H_2ZrF_6$ | Zr: 6 | — | — | — | — |
| 7 | $Zr(SO_4)_2$ | Zr: 6 | — | — | — | — |
| 8 | $HfF_4$ | Hf: 1 | — | — | — | — |
| 9 | $H_2SiF_6$ | Si: 2 | $H_3PO_4$ | P: 10 | — | — |
| 10 | $Al(NO_3)_3 \cdot 9H_2O$ | Al: 1 | — | — | — | — |
| 11 | $(NH_4)_{10}W_{12}O_{41}$ | W: 3 | — | — | — | — |
| 12 | Niobic acid sol | Nb: 2 | — | — | Tartaric acid | 10 |
| 13 | $Ta_2O_5 \cdot nH_2O$ | Ta: 1 | — | — | — | — |
| 14 | $V_2O_5$ $ZrO(NO_3)_2 \cdot 2H_2O$ | V: 5 Zr: 6 | $H_3PO_4$ | P: 10 | — | — |
| 15 | $ZrO(NO_3)_2 \cdot 2H_2O$ | Zr: 10 | — | — | — | — | evaluated as "A", more than 0% and less than 5% as "B", 5% or more and less than 10% as "C", and 10% or more as "D".

The lightness and the results of corrosion resistance testing for the plating layer surface of each of the plated steel sheets after water vapor treatment are shown in Tables 6 and 7.

Example 4

A black-plated steel sheet in Example 39 (L* value: 32) and a black-plated steel sheet in Example 55 (L* value: 30) in Table 4 were coated with an organic chemical treatment liquid shown in Table 8, and placed in an electric oven

TABLE 6

| | | Inorganic treatment | | | | | | | Corrosion |
| | | | Attachment | Conditions for contacting with water vapor | | | | Blackness | resistance |
| | Plated steel sheet (refer to Table 3) | Treatment liquid No. (refer to Table 5) | amount of valve metal (mg/m$^2$) | Temperature (° C.) | Relative humidity (%) | Oxygen concentration (%) | Treatment time (hour) | degree Lightness (L* value) | White-rusted area ratio (%) |
|---|---|---|---|---|---|---|---|---|---|
| Example 59 | 36 | 1 | Ti: 60 | 110 | 80 | 4 | 24 | 34(A) | 0(A) |
| Example 60 | | 2 | Ti: 70 | | | | | 34(A) | 0(A) |
| Example 61 | | 3 | Ti: 80 | | | | | 34(A) | 0(A) |
| Example 62 | | 4 | V: 50 | | | | | 35(A) | 0(A) |
| Example 63 | | 5 | V: 50 | | | | | 34(A) | 0(A) |
| Example 64 | | 6 | Zr: 100 | | | | | 35(A) | 0(A) |
| Example 65 | | 7 | Zr: 60 | | | | | 36(B) | 0(A) |
| Example 66 | | 8 | Hf: 100 | | | | | 34(A) | 0(A) |
| Example 67 | | 9 | Si: 200 | | | | | 35(A) | 0(A) |
| Example 68 | | 10 | Al: 150 | | | | | 36(B) | 0(A) |
| Example 69 | | 11 | W: 90 | | | | | 34(A) | 0(A) |
| Example 70 | | 12 | Nb: 80 | | | | | 35(A) | 0(A) |
| Example 71 | | 13 | Ta: 70 | | | | | 34(A) | 0(A) |
| Example 72 | | 14 | V: 60 | | | | | 35(A) | 0(A) |
| Example 73 | | 15 | Zr: 100 | | | | | 36(B) | 0(A) |
| Example 74 | | | None | | | | | 32(A) | 70(D) |

TABLE 7

| | | Inorganic treatment | | | | | | | Corrosion |
| | | | Attachment | Conditions for contacting with water vapor | | | | Blackness | resistance |
| | Plated steel sheet (refer to Table 3) | Treatment liquid No. (refer to Table 5) | amount of valve metal (mg/m$^2$) | Temperature (° C.) | Relative humidity (%) | Oxygen concentration (%) | Treatment time (hour) | degree Lightness (L* value) | White-rusted area ratio (%) |
|---|---|---|---|---|---|---|---|---|---|
| Example 75 | 52 | 1 | Ti: 60 | 110 | 80 | 4 | 24 | 33(A) | 0(A) |
| Example 76 | | 2 | Ti: 70 | | | | | 35(A) | 0(A) |
| Example 77 | | 3 | Ti: 80 | | | | | 35(A) | 0(A) |
| Example 78 | | 4 | V: 50 | | | | | 34(A) | 0(A) |
| Example 79 | | 5 | V: 50 | | | | | 33(A) | 0(A) |
| Example 80 | | 6 | Zr: 100 | | | | | 36(B) | 0(A) |
| Example 81 | | 7 | Zr: 60 | | | | | 35(A) | 0(A) |
| Example 82 | | 8 | Hf: 100 | | | | | 36(B) | 0(A) |
| Example 83 | | 9 | Si: 200 | | | | | 37(B) | 0(A) |
| Example 84 | | 10 | Al: 150 | | | | | 35(A) | 0(A) |
| Example 85 | | 11 | W: 90 | | | | | 35(A) | 0(A) |
| Example 86 | | 12 | Nb: 80 | | | | | 34(A) | 0(A) |
| Example 87 | | 13 | Ta: 70 | | | | | 35(A) | 0(A) |
| Example 88 | | 14 | V: 60 | | | | | 34(A) | 0(A) |
| Example 89 | | 15 | Zr: 100 | | | | | 33(A) | 0(A) |
| Example 90 | | | None | | | | | 31(A) | 73(D) |

From Tables 6 and 7, it was proved that the corrosion resistance of a black-plated steel sheet can be further improved by the formation of the inorganic coating film. A 180 degree bending test was also performed for each of the plated steel sheets after water vapor treatment (Examples 59 to 90). In the 180 degree bending test, a sample piece cut out from each of the plated steel sheets was bent at 180 degrees (3 t), and the cellophane tape peeling test was performed for the bent part. As a result, no peeling was found for any one in Examples 59 to 90.

without washing with water so as to be heated and dried under conditions for the plate temperature to reach 160° C. Consequently an organic resin coating film was formed on the surface of the black-plated steel sheet. The urethane resin for use was APX-601 (made by DIC Corporation). The epoxy resin for use was EM-0718 (made by ADEKA Corporation). The acrylic resin for use was SFC-55 (made by DIC Corporation).

TABLE 8

| Treatment liquid No. | Organic resin Type | Concentration (g/L) | Lubricant Concentration (g/L) | Valve metal compound Type | Concentration (g/L) | Phosphate Type | Concentration (g/L) | Organic acid Type | Concentration (g/L) |
|---|---|---|---|---|---|---|---|---|---|
| 1 | Urethane resin | 100 | — | — | — | $H_3PO_4$ | P: 1 | — | — |
| 2 | Epoxy resin | 100 | — | $(NH_4)_2TiF_6$ | Ti: 1 | $H_3PO_4$ | P: 1 | — | — |
| 3 | Urethane resin | 100 | — | $H_2TiF_6$ | Ti: 1 | — | — | — | — |
| 4 | Acrylic resin | 100 | — | $(NH_4)VO_3$ | V: 1 | — | — | — | — |
| 5 | Urethane resin | 100 | — | $V_2O_5$ | V: 1 | $H_3PO_4$ | P: 1 | — | — |
| 6 | Urethane resin | 100 | 5 | $V_2O_5$ | V: 1 | $H_3PO_4$ | P: 1 | — | — |
| 7 | Polyolefin resin | 100 | — | $Zr(SO_4)_2$ | Zr: 1 | — | — | — | — |
| 8 | Acrylic resin | 100 | — | $HfF_4$ | Hf: 1 | — | — | — | — |
| 9 | Urethane resin | 100 | — | $H_2SiF_6$ | Si: 1 | $H_3PO_4$ | P: 1 | — | — |
| 10 | Fluorine resin | 100 | — | $Al(NO_3)_3 \cdot 9H_2O$ | Al: 1 | — | — | — | — |
| 11 | Polyester resin | 100 | — | — | — | — | — | Tannic acid | 10 |
| 12 | Urethane resin | 100 | — | Niobic acid sol | Nb: 1 | — | — | — | — |
| 13 | Urethane resin | 100 | — | $Ta_2O_5 \cdot nH_2O$ | Ta: 1 | — | — | — | — |
| 14 | Acrylic resin | 100 | — | $V_2O_5$ | V: 1 | $H_3PO_4$ | P: 1 | — | — |
| 15 | Urethane resin | 100 | — | $ZrO(NO_3)_2 \cdot 2H_2O$ | Zr: 1 | — | — | — | — |

Lubricant: polyethylene-based wax (average particle diameter: 1.0 μm)

A corrosion resistance testing and a galling resistance testing were performed for each of the plated steel sheets having the organic resin coating film (Examples 91 to 122). The corrosion resistance testing was performed in accordance with JIS Z 2371 in the same way as in Example 3. In the galling resistance testing, a 30-mm by 250-mm sample piece was subjected to a bead drawing test (bead height: 4 mm, applied pressure: 3.0 kN), and the sliding surface was visually observed after testing. The sample piece with a proportion of scratched area in the sliding surface of 0% (no scratch) was evaluated as "A", more than 0% and less than 5% as "B", 5% or more and less than 10% as "C", and 10% or more as "D".

The results of the corrosion resistance testing and the galling resistance testing for each plated steel sheet are shown in Table 9.

TABLE 9

| Black-plated steel sheet (refer to Table 4) | Organic treatment Treatment liquid No. (refer to Table 8) | Film thickness (μm) | Corrosion resistance White-rusted area ratio (%) | Galling resistance Scratched area ratio (%) |
|---|---|---|---|---|
| Example 91 | Example 39 | 1 | 2 | 0(A) | 3(B) |
| Example 92 | | 2 | 2 | 0(A) | 9(C) |
| Example 93 | | 3 | 2 | 0(A) | 3(B) |
| Example 94 | | 4 | 2 | 0(A) | 6(C) |
| Example 95 | | 5 | 2 | 0(A) | 3(B) |
| Example 96 | | 6 | 2 | 0(A) | 0(A) |
| Example 97 | | 7 | 2 | 0(A) | 5(C) |
| Example 98 | | 8 | 2 | 0(A) | 6(C) |
| Example 99 | | 9 | 2 | 0(A) | 3(B) |
| Example 100 | | 10 | 2 | 0(A) | 2(B) |
| Example 101 | | 11 | 2 | 0(A) | 5(C) |
| Example 102 | | 12 | 2 | 0(A) | 3(B) |
| Example 103 | | 13 | 2 | 0(A) | 3(B) |
| Example 104 | | 14 | 2 | 0(A) | 6(C) |
| Example 105 | | 15 | 2 | 0(A) | 3(B) |
| Example 106 | | None | | 70(D) | 90(D) |
| Example 107 | Example 55 | 1 | 2 | 0(A) | 2(B) |
| Example 108 | | 2 | 2 | 0(A) | 8(C) |
| Example 109 | | 3 | 2 | 0(A) | 4(B) |
| Example 110 | | 4 | 2 | 0(A) | 7(C) |
| Example 111 | | 5 | 2 | 0(A) | 4(B) |
| Example 112 | | 6 | 2 | 0(A) | 0(A) |
| Example 113 | | 7 | 2 | 0(A) | 6(C) |
| Example 114 | | 8 | 2 | 0(A) | 7(C) |
| Example 115 | | 9 | 2 | 0(A) | 4(B) |
| Example 116 | | 10 | 2 | 0(A) | 3(B) |
| Example 117 | | 11 | 2 | 0(A) | 6(C) |
| Example 118 | | 12 | 2 | 0(A) | 2(B) |
| Example 119 | | 13 | 2 | 0(A) | 4(B) |
| Example 120 | | 14 | 2 | 0(A) | 7(C) |
| Example 121 | | 15 | 2 | 0(A) | 2(B) |
| Example 122 | | None | | 75(D) | 85(D) |

From Table 9, it was proved that the corrosion resistance and the galling resistance of a black-plated steel sheet can be further improved by the formation of the organic resin coating film.

Example 5

A plated steel sheet No. 36 or 52 in Table 3 was coated with an organic chemical treatment liquid shown in Table 10, and placed in an electric oven without washing with water so as to be heated and dried under conditions for the plate temperature to reach 160° C. Consequently an organic resin coating film (urethane-based resin coating film) was formed on the surface of the plated steel sheet. The ether-based polyol for use was polypropylene glycol. The ester-based polyol for use was adipic acid. The polyisocyanate for use was hydrogenated tolylenediisocyanate.

TABLE 10

| Treatment liquid No. | Urethane-based resin Polyol ratio (mass %) | | Concentration (g/L) | Valve metal compound | | Phosphate | | Polyvalent phenol | |
|---|---|---|---|---|---|---|---|---|---|
| | Ether-based (polypropylene glycol) | Ester-based (adipic acid) | | Type | Concentration (g/L) | Type | Concentration (g/L) | Type | Concentration (g/L) |
| 16 | 5 | 95 | 100 | — | — | — | — | — | — |
| 17 | 5 | 95 | 100 | $H_2TiF_6$ | Ti: 1 | $H_3PO_4$ | P: 1 | — | — |
| 18 | 5 | 95 | 100 | $(NH_4)VO_3$ | V: 1 | $H_3PO_4$ | P: 1 | — | — |
| 19 | 5 | 95 | 100 | $ZrO(NO_3)_2 \cdot 2H_2O$ | Zr: 1 | — | — | — | — |
| 20 | 5 | 95 | 100 | $HfF_4$ | Hf: 1 | — | — | — | — |
| 21 | 5 | 95 | 100 | $H_2SiF_6$ | Si: 1 | — | — | — | — |
| 22 | 5 | 95 | 100 | Niobic acid sol | Nb: 1 | — | — | — | — |
| 23 | 5 | 95 | 100 | $Al(NO_3)_3 \cdot 9H_2O$ | Al: 1 | — | — | — | — |
| 24 | 5 | 95 | 100 | $Ta_2O_5 \cdot nH_2O$ | Ta: 1 | — | — | — | — |
| 25 | 5 | 95 | 100 | $V_2O_5$ | V: 1 | $H_3PO_4$ | P: 1 | — | — |
| 26 | 5 | 95 | 100 | — | — | — | — | Tannic acid | 10 |
| 27 | 30 | 70 | 100 | — | — | — | — | — | — |
| 28 | 30 | 70 | 100 | $(NH_4)VO_3$ | V: 1 | $H_3PO_4$ | P: 1 | — | — |
| 29 | 30 | 70 | 100 | $V_2O_5$ | V: 1 | $H_3PO_4$ | P: 1 | — | — |
| 30 | 30 | 70 | 180 | $ZrO(NO_3)_2 \cdot 2H_2O$ | Zr: 1 | — | — | — | — |
| 31 | 30 | 70 | 100 | — | — | — | — | Tannic acid | 10 |
| 32 | 0 | 100 | 100 | — | — | — | — | — | — |
| 33 | 0 | 100 | 100 | $(NH_4)VO_3$ | V: 1 | $H_3PO_4$ | P: 1 | — | — |
| 34 | 0 | 100 | 100 | $V_2O_5$ | V: 1 | $H_3PO_4$ | P: 1 | — | — |
| 35 | 0 | 100 | 100 | $ZrO(NO_3)_2 \cdot 2H_2O$ | Zr: 1 | — | — | — | — |
| 36 | 0 | 100 | 100 | — | — | — | — | Tannic acid | 10 |
| 37 | 2 | 98 | 100 | — | — | — | — | — | — |
| 38 | 35 | 65 | 100 | — | — | — | — | — | — |
| 39 | 2 | 98 | 100 | — | — | — | — | Tannic acid | 10 |
| 40 | 35 | 65 | 100 | — | — | — | — | Tannic acid | 10 |

The plated steel sheet having the organic resin coating film was placed in a high-temperature and high-pressure heat-moisture treatment apparatus, and the plating layer was contacted with water vapor under the conditions shown in Tables 11 and 12.

The cross section of a plating layer was observed for each of the plated steel sheets after water vapor treatment (Examples 123 to 172) with an optical microscope. It was observed that the $Zn_2Mg$ phases distributed in a lamellar form mainly in the ternary eutectic, partially crystallized $Zn_2Mg$ phases, and $Zn_2Mg$ phases of $Al/Zn_2Mg$ were blackened.

The measurement of the lightness of a plating layer surface and a corrosion resistance testing were performed for each of the plated steel sheets after water vapor treatment (Examples 123 to 172). The measurement of the lightness of a plating layer surface was performed in the same way as in Example 1. The corrosion resistance testing was performed in the same way as in Example 3.

The lightness and the results of corrosion resistance testing for the plating layer surface of each of the plated steel sheets after water vapor treatment are shown in Tables 11 and 12.

TABLE 11

| | Organic treatment | | | Conditions for contacting with water vapor | | | | Blackness | Corrosion resistance |
|---|---|---|---|---|---|---|---|---|---|
| | Plated steel sheet (refer to Table 3) | Treatment liquid No. (refer to Table 10) | Film thickness (μm) | Temperature (° C.) | Relative humidity (%) | Oxygen concentration (%) | Treatment time (hour) | degree Lightness (L* value) | White-rusted area ratio (%) |
| Example 123 | 36 | 16 | 2 | 110 | 90 | 4 | 21 | 31(A) | 9(C) |
| Example 124 | | 17 | 2 | | | | | 32(A) | 4(B) |
| Example 125 | | 18 | 2 | | | | | 32(A) | 3(B) |
| Example 126 | | 19 | 2 | | | | | 31(A) | 4(B) |
| Example 127 | | 20 | 2 | | | | | 32(A) | 4(B) |
| Example 128 | | 21 | 2 | | | | | 32(A) | 4(B) |
| Example 129 | | 22 | 2 | | | | | 31(A) | 3(B) |
| Example 130 | | 23 | 2 | | | | | 31(A) | 4(B) |
| Example 131 | | 24 | 2 | | | | | 33(A) | 4(B) |
| Example 132 | | 25 | 2 | | | | | 32(A) | 3(B) |
| Example 133 | | 26 | 2 | | | | | 33(A) | 0(A) |
| Example 134 | | 27 | 2 | | | | | 31(A) | 9(C) |
| Example 135 | | 28 | 2 | | | | | 31(A) | 3(B) |
| Example 136 | | 29 | 2 | | | | | 31(A) | 3(B) |
| Example 137 | | 30 | 2 | | | | | 30(A) | 3(B) |
| Example 138 | | 31 | 2 | | | | | 30(A) | 0(A) |
| Example 139 | | 32 | 2 | | | | | 33(A) | 20(D) |
| Example 140 | | 33 | 2 | | | | | 32(A) | 15(D) |
| Example 141 | | 34 | 2 | | | | | 33(A) | 14(D) |

TABLE 11-continued

|  | Plated steel sheet (refer to Table 3) | Organic treatment | | Conditions for contacting with water vapor | | | | Blackness | Corrosion resistance |
|  |  | Treatment liquid No. (refer to Table 10) | Film thickness (μm) | Temperature (° C.) | Relative humidity (%) | Oxygen concentration (%) | Treatment time (hour) | degree Lightness (L* value) | White-rusted area ratio (%) |
| --- | --- | --- | --- | --- | --- | --- | --- | --- | --- |
| Example 142 |  | 35 | 2 |  |  |  |  | 31(A) | 15(D) |
| Example 143 |  | 36 | 2 |  |  |  |  | 31(A) | 13(D) |
| Example 144 |  | 37 | 2 |  |  |  |  | 33(A) | 15(D) |
| Example 145 |  | 38 | 2 |  |  |  |  | 32(A) | 15(D) |
| Example 146 |  | 39 | 2 |  |  |  |  | 33(A) | 10(D) |
| Example 147 |  | 40 | 2 |  |  |  |  | 31(A) | 10(D) |

TABLE 12

|  | Plated steel sheet (refer to Table 3) | Organic treatment | | Conditions for contacting with water vapor | | | | Blackness | Corrosion resistance |
|  |  | Treatment liquid No. (refer to Table 10) | Film thickness (μm) | Temperature (° C.) | Relative humidity (%) | Oxygen concentration (%) | Treatment time (hour) | degree Lightness (L* value) | White-rusted area ratio (%) |
| --- | --- | --- | --- | --- | --- | --- | --- | --- | --- |
| Example 148 | 52 | 16 | 2 | 110 | 90 | 4 | 21 | 32(A) | 8(C) |
| Example 149 |  | 17 | 2 |  |  |  |  | 31(A) | 4(B) |
| Example 150 |  | 18 | 2 |  |  |  |  | 33(A) | 4(B) |
| Example 151 |  | 19 | 2 |  |  |  |  | 32(A) | 3(B) |
| Example 152 |  | 20 | 2 |  |  |  |  | 33(A) | 3(B) |
| Example 153 |  | 21 | 2 |  |  |  |  | 30(A) | 3(B) |
| Example 154 |  | 22 | 2 |  |  |  |  | 32(A) | 4(B) |
| Example 155 |  | 23 | 2 |  |  |  |  | 33(A) | 3(B) |
| Example 156 |  | 24 | 2 |  |  |  |  | 32(A) | 3(B) |
| Example 157 |  | 25 | 2 |  |  |  |  | 31(A) | 4(B) |
| Example 158 |  | 26 | 2 |  |  |  |  | 30(A) | 0(A) |
| Example 159 |  | 27 | 2 |  |  |  |  | 32(A) | 8(C) |
| Example 160 |  | 28 | 2 |  |  |  |  | 33(A) | 4(B) |
| Example 161 |  | 29 | 2 |  |  |  |  | 32(A) | 4(B) |
| Example 162 |  | 30 | 2 |  |  |  |  | 31(A) | 4(B) |
| Example 163 |  | 31 | 2 |  |  |  |  | 32(A) | 0(A) |
| Example 164 |  | 32 | 2 |  |  |  |  | 31(A) | 25(D) |
| Example 165 |  | 33 | 2 |  |  |  |  | 33(A) | 17(D) |
| Example 166 |  | 34 | 2 |  |  |  |  | 32(A) | 15(D) |
| Example 167 |  | 35 | 2 |  |  |  |  | 30(A) | 14(D) |
| Example 168 |  | 36 | 2 |  |  |  |  | 32(A) | 12(D) |
| Example 169 |  | 37 | 2 |  |  |  |  | 32(A) | 17(D) |
| Example 170 |  | 38 | 2 |  |  |  |  | 33(A) | 14(D) |
| Example 171 |  | 39 | 2 |  |  |  |  | 31(A) | 11(D) |
| Example 172 |  | 40 | 2 |  |  |  |  | 33(A) | 13(D) |

In the present example, after an organic resin coating film was formed on a hot-dip Al and Mg-containing Zn-plated steel sheet, the plated steel sheet having the organic resin coating film was contacted with water vapor so as to be blackened. In this instance, the formation of an organic resin coating film insufficiently improved the corrosion resistance in some cases (refer to Examples 139 to 147, and 164 to 172). The formation of the inorganic coating film or the organic coating film of the present invention on a plating layer did not interfere blackening. In contrast, the black-plated steel sheet in Examples 123 to 138 and 148 to 163 having a urethane-based resin coating film in combination of an ether-based polyol and an ester-based polyol with a proportion of the ether-based polyol of 5 to 30% had sufficient corrosion resistance. It was also found that the addition of an organic acid to the urethane-based resin coating film further improved the corrosion resistance compared to the addition of a valve metal compound or a phosphate (refer to Examples 133, 138, 158 and 163). A 180 degree bending test was also performed for each of the plated steel sheets after water vapor treatment (Examples 123 to 172). In the 180 degree bending test, a sample piece cut out from each of the plated steel sheets was bent at 180 degrees (3 t), and the cellophane tape peeling test was performed for the bent part. As a result, no peeling was found for any one in Examples 123 to 172.

Example 6

A black-plated steel sheet in Example 39 (L* value: 32) and a black-plated steel sheet in Example 55 (L* value: 30) in Table 4 were coated with an inorganic chemical treatment liquid shown in Table 5, and placed in an electric oven without washing with water so as to be heated and dried under conditions for the plate temperature to reach 140° C. Consequently an inorganic coating film was formed on the surface of the black-plated steel sheet.

A corrosion resistance testing was performed for each of the plated steel sheets having the inorganic coating film (Examples 173 to 204). The corrosion resistance testing was performed in accordance with JIS Z 2371 in the same way as in Example 3. The results of the corrosion resistance testing for each plated steel sheet are shown in Table 13.

TABLE 13

| Black-plated steel sheet (refer to Table 4) | Inorganic treatment | | Corrosion resistance White-rusted area ratio (%) |
|---|---|---|---|
| | Treatment liquid No. (refer to Table 8) | Attachment amount of valve metal (mg/m$^2$) | |
| Example 173 | Example 39 | 1 | Ti: 20 | 0(A) |
| Example 174 | | 2 | Ti: 10 | 0(A) |
| Example 175 | | 3 | Ti: 30 | 0(A) |
| Example 176 | | 4 | V: 40 | 0(A) |
| Example 177 | | 5 | V: 25 | 0(A) |
| Example 178 | | 6 | Zr: 15 | 0(A) |
| Example 179 | | 7 | Zr: 80 | 0(A) |
| Example 180 | | 8 | Hf: 70 | 0(A) |
| Example 181 | | 9 | Si: 100 | 0(A) |
| Example 182 | | 10 | Al: 120 | 0(A) |
| Example 183 | | 11 | W: 60 | 0(A) |
| Example 184 | | 12 | Nb: 85 | 0(A) |
| Example 185 | | 13 | Ta: 50 | 0(A) |
| Example 186 | | 14 | V: 30 | 0(A) |
| Example 187 | | 15 | Zr: 45 | 0(A) |
| Example 188 | | | None | 74(D) |
| Example 189 | Example 55 | 1 | Ti: 20 | 0(A) |
| Example 190 | | 2 | Ti: 10 | 0(A) |
| Example 191 | | 3 | Ti: 30 | 0(A) |
| Example 192 | | 4 | V: 40 | 0(A) |
| Example 193 | | 5 | V: 25 | 0(A) |
| Example 194 | | 6 | Zr: 15 | 0(A) |
| Example 195 | | 7 | Zr: 80 | 0(A) |
| Example 196 | | 8 | Hf: 70 | 0(A) |
| Example 197 | | 9 | Si: 100 | 0(A) |
| Example 198 | | 10 | Al: 120 | 0(A) |
| Example 199 | | 11 | W: 60 | 0(A) |
| Example 200 | | 12 | Nb: 85 | 0(A) |
| Example 201 | | 13 | Ta: 50 | 0(A) |
| Example 202 | | 14 | V: 30 | 0(A) |
| Example 203 | | 15 | Zr: 45 | 0(A) |
| Example 204 | | | None | 76(D) |

From Table 13, it was proved that the formation of an inorganic coating film further improves the corrosion resistance of a black-plated steel sheet.

A 180 degree bending test was also performed for each of the plated steel sheets after water vapor treatment (Examples 173 to 204). In the 180 degree bending test, a sample piece cut out from each of the plated steel sheets was bent at 180 degrees (3 t), and the cellophane tape peeling test was performed for the bent part. As a result, no peeling was found for any one in Examples 173 to 204.

The present application claims priority based on Japanese Patent Application No. 2012-100437 filed on Apr. 25, 2012 and Japanese Patent Application No. 2012-134807 filed on Jun. 14, 2012. The disclosure in specification and drawing of the applications is incorporated herein by reference in its entirety.

INDUSTRIAL APPLICABILITY

The black-plated steel sheet of the present invention is excellent in the design, the retention of black appearance, and the press formability, being applicable as a plated steel sheet for, for example, roofing materials and exterior materials of a building, home appliances, and automobiles.

The invention claimed is:

1. A black-plated steel sheet comprising:
   a hot-dip Al and Mg-containing Zn-plated layer which comprises 1.0 to 22.0 mass % of Al and 1.3 to 10.0 mass % of Mg, comprising a black oxide of Zn derived from a $Zn_2Mg$ phase distributed in a lamellar form,
   wherein the black oxide of Zn contained in the $Zn_2Mg$ phase extends in the depth direction of the hot-dip Al and Mg-containing Zn-plated layer, and
   wherein the hot-dip Al and Mg-containing Zn-plated layer has a surface lightness represented by L* value of 60 or less.

2. The black-plated steel sheet according to claim 1, further comprising an inorganic coating film on the hot-dip Al and Mg-containing Zn-plated layer.

3. The black-plated steel sheet according to claim 2, wherein the inorganic coating film comprises one or more compounds selected from the group consisting of an oxide of valve metal, an oxoate of valve metal, a hydroxide of valve metal, a phosphate of valve metal, and a fluoride of valve metal, and
   the valve metal is one or more metals selected from the group consisting of Ti, Zr, Hf, V, Nb, Ta, W, Si and Al.

4. The black-plated steel sheet according to claim 1, further comprising an organic resin coating film on the hot-dip Al and Mg-containing Zn-plated layer.

5. The black-plated steel sheet according to claim 4, wherein an organic resin comprised in the organic resin coating film is urethane-based resin obtained by the reaction of polyols including an ether-based polyol and an ester-based polyol with polyisocyanate,
   a proportion of the ether-based polyol in the polyols being 5 to 30 mass %.

6. The black-plated steel sheet according to claim 5, wherein the organic resin coating film further comprises a polyvalent phenol.

7. The black-plated steel sheet according to claim 4, wherein the organic resin coating film comprises a lubricant.

8. The black-plated steel sheet according to claim 4, wherein the organic resin coating film comprises one or more compounds selected from the group consisting of an oxide of valve metal, an oxoate of valve metal, a hydroxide of valve metal, a phosphate of valve metal, and a fluoride of valve metal, and
   the valve metal is one or more metals selected from the group consisting of Ti, Zr, Hf, V, Nb, Ta, W, Si and Al.

9. The black-plated steel sheet according to claim 4, wherein the organic resin coating film is a laminate layer or a coating layer.

10. The black-plated steel sheet according to claim 4, wherein the organic resin coating film is a clear coating film.

11. The black-plated steel sheet according to claim 1, wherein the black oxide extends in the depth direction from the surface of the hot-dip Al and Mg-containing Zn-plated layer.

* * * * *